(12) United States Patent
Anantharaj et al.

(10) Patent No.: US 12,254,047 B2
(45) Date of Patent: Mar. 18, 2025

(54) METHOD AND SYSTEM FOR MANAGING QUERIES OF USER IN IOT NETWORK

(71) Applicant: SAMSUNG ELECTRONICS CO., LTD., Suwon-si (KR)

(72) Inventors: Katpagavalli Anantharaj, Karnataka (IN); Karthikeyan Subramani, Karnataka (IN); Kaja Sheik Mohammed Mohideen, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/150,483

(22) Filed: Jan. 15, 2021

(65) Prior Publication Data

US 2021/0304904 A1    Sep. 30, 2021

(30) Foreign Application Priority Data

Mar. 27, 2020   (IN) .............................. 202041013394
Aug. 5, 2020    (KR) ........................ 10-2020-0098044

(51) Int. Cl.
  *G06F 16/9035*   (2019.01)
  *G06F 16/903*    (2019.01)
  (Continued)

(52) U.S. Cl.
  CPC .... *G06F 16/90335* (2019.01); *G06F 16/9035* (2019.01); *G16Y 10/75* (2020.01); *G16Y 40/30* (2020.01)

(58) Field of Classification Search
  CPC .......... G06F 16/90335; G06F 16/9035; G16Y 10/75; G16Y 40/30
  See application file for complete search history.

(56) References Cited

U.S. PATENT DOCUMENTS 7,313,598 B1    12/2007  Sheth
10,089,072 B2   10/2018  Piersol et al.
(Continued)

FOREIGN PATENT DOCUMENTS

CN    105117497 A    12/2015
EP    3 311 313 A1    4/2018
(Continued)

OTHER PUBLICATIONS

N. Narasimhan, J. Wodka, P. Wong and V. Vasudevan, "TV Answers—Using the Wisdom of Crowds to Facilitate Searches with Rich Media Context," 2010 7th IEEE Consumer Communications and Networking Conference, Las Vegas, NV, USA, 2010, pp. 1-5, (Year: 2010).*

(Continued)

*Primary Examiner* — Jason D Recek
(74) *Attorney, Agent, or Firm* — Sughrue Mion, PLLC

(57) ABSTRACT

A method for controlling a first electronic device that manages a user query in an Internet of Things (IoT) network is disclosed. The method may include receiving a first query from the user, identifying whether the received first query is a static event in which a complete response can be generated by the first electronic device or a dynamic event in which a complete response cannot be generated by the first electronic device, based on the first query being identified as the static event, processing the first query, and based on the first query being identified as the dynamic event, transmitting the first query to a second electronic device.

17 Claims, 24 Drawing Sheets

(51) Int. Cl.
*G16Y 10/75* (2020.01)
*G16Y 40/30* (2020.01)

(56) References Cited

U.S. PATENT DOCUMENTS

| | | |
|---|---|---|
| 10,133,546 B2 | 11/2018 | Hart et al. |
| 10,942,702 B2 | 3/2021 | Piersol et al. |
| 2014/0007075 A1* | 1/2014 | Sporkert ............... G06F 8/658 |
| | | 717/173 |
| 2015/0006702 A1 | 1/2015 | Lakes et al. |
| 2015/0156266 A1 | 6/2015 | Gupta |
| 2015/0326444 A1 | 11/2015 | Smith et al. |
| 2016/0080475 A1* | 3/2016 | Singh ................... G06F 9/5044 |
| | | 709/217 |
| 2017/0195424 A1 | 7/2017 | Nasir et al. |
| 2017/0249355 A1* | 8/2017 | Kang ................... G06Q 20/306 |
| 2017/0357478 A1 | 12/2017 | Piersol et al. |
| 2018/0144055 A1* | 5/2018 | Wu ....................... G06F 16/954 |
| 2018/0233147 A1 | 8/2018 | Tukka et al. |
| 2018/0341643 A1* | 11/2018 | Alders ................ G10L 15/1822 |
| 2018/0349376 A1* | 12/2018 | Boyer ................... G06F 3/167 |
| 2019/0012141 A1 | 1/2019 | Piersol et al. |
| 2019/0147092 A1* | 5/2019 | Pal ....................... H04L 67/125 |
| | | 707/713 |
| 2019/0171438 A1* | 6/2019 | Franchitti ............ G06N 20/00 |
| 2020/0045546 A1 | 2/2020 | Zhou |
| 2020/0050949 A1* | 2/2020 | Sundararaman ...... G06F 40/284 |
| 2020/0135200 A1* | 4/2020 | Taparia ................. G06F 3/167 |
| 2021/0294569 A1 | 9/2021 | Piersol et al. |

FOREIGN PATENT DOCUMENTS

| | | |
|---|---|---|
| JP | 6095487 B2 | 3/2017 |
| KR | 10-2017-0101052 A | 9/2017 |
| KR | 10-2018-0133526 A | 12/2018 |
| KR | 10-2019-0121842 A | 10/2019 |
| WO | 2015013984 A1 | 2/2015 |
| WO | 2017/036271 A1 | 3/2017 |

OTHER PUBLICATIONS

Gyujun Jeong, "Introduction of Artificial Intelligence Service Technology 'Nugu'", SK Telecom, Jun. 22, 2018, pp. 1-55 (55 pages total).

International Search Report (PCT/ISA/210) issued by the International Searching Authority in International Application No. PCT/KR2021/002376, issued on Jun. 17, 2021.

Written Opinion (PCT/ISA/237) issued by the International Searching Authority in International Application No. PCT/KR2021/002376, issued on Jun. 17, 2021.

Communication dated Nov. 3, 2021, from the Intellectual Property Office of India in Application No. 202041013394.

* cited by examiner

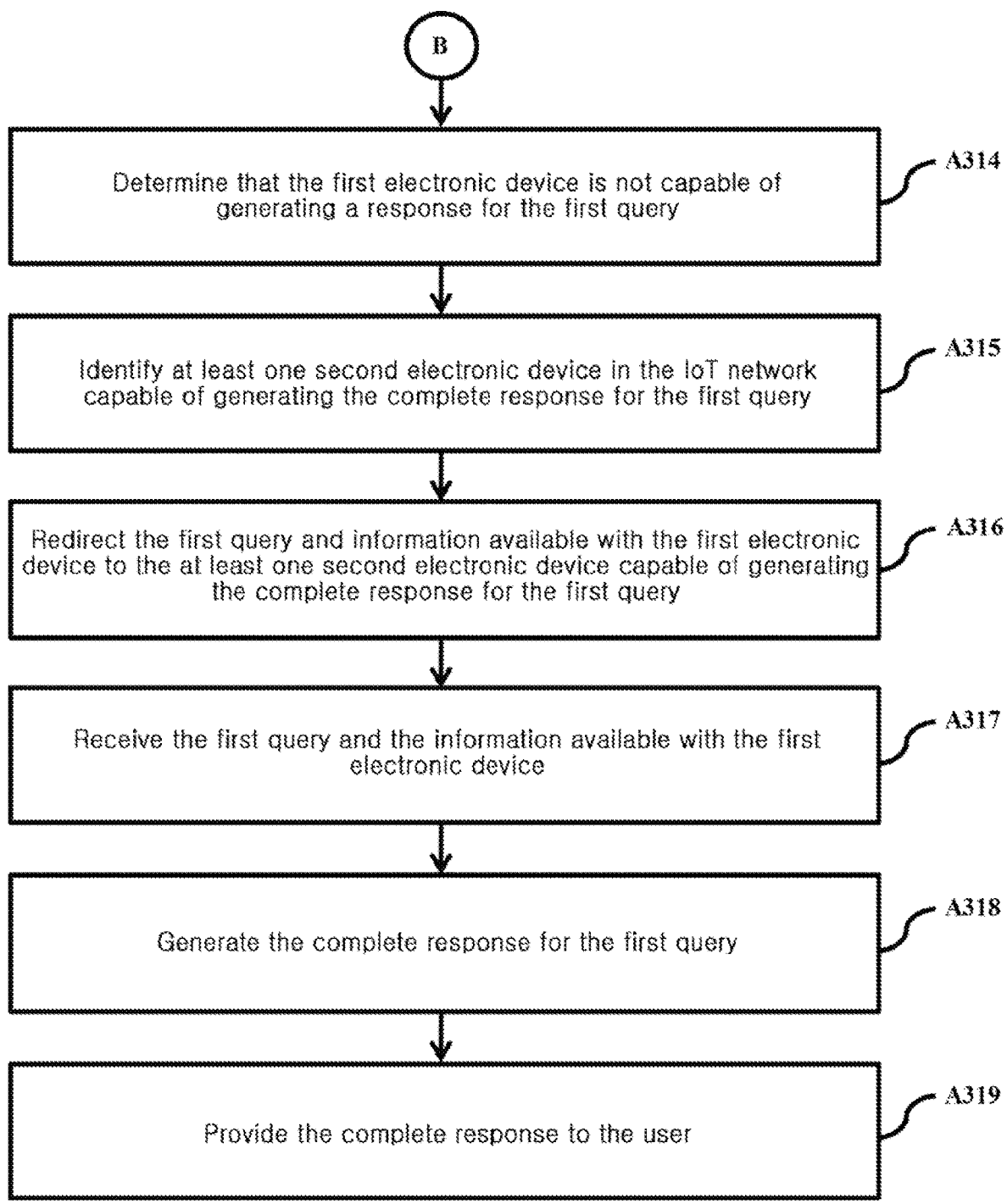

METHOD AND SYSTEM FOR MANAGING QUERIES OF USER IN IOT NETWORK

CROSS-REFERENCE TO RELATED APPLICATION(S)

This application is based on and claims priority under 35 U.S.C. § 119(a) of an India Patent Application No. 202041013394, filed on Mar. 27, 2020 in Intellectual Property India, and a Korean Patent Application No. 10-2020-0098044, filed on Aug. 5, 2020 in the Korean Intellectual Property Office (KIPO), the disclosures of which are incorporated by reference herein in its entirety.

BACKGROUND

1. Field

The present disclosure relates to electronic devices, and more specifically to a method and a system for managing queries of a user in an Internet of Things (IoT) network.

2. Description of Related Art

An electronic device such as a smartphone, a tablet, a laptop, wireless audio devices (e.g. a Wi-Fi speaker, a Bluetooth speaker etc.), an Internet of Things devices (IoTs) etc., attains a role of a personal assistant for providing responses to queries of a user. However, the IoTs operate as slave devices of personal assistant enabled wireless audio devices, where the personal assistant enabled wireless audio devices are master devices. Therefore, capabilities of the IoTs are limited to control self-operations based on the queries. Further, one IoT device does not have the capability to control operations of another IoT device, much less, the master devices. Hence, an intelligent framework is desirable to control operations of the electronic devices immaterial of a relationship between the devices (e.g., a master-slave relationship) and immaterial of which one of the devices (e.g., a slave device or a master device) receives the queries from the user.

Conventionally, the master devices provide responses to the user for the queries, when the master devices are capable of generating the responses. Moreover, the master devices provide a response (e.g., a no-action response) to the user when the master devices are unable to generate relevant results for the queries, which worsens user experience in using the personal assistant enabled electronic devices. Thus, it is desired to at least provide a useful alternative to, for example, the no-action response.

SUMMARY

According to embodiments of the disclosure, a method and system may be provided for managing queries of a user in an Internet of Things (IoT) network.

The system for managing queries may include a processor configured to perform the method for managing queries.

According to an embodiment, according to the method, the queries may be processed within the IoT network to generate a complete response, based on the queries corresponding to a static event.

According to an embodiment, the method may further include transmitting (or redirecting) the queries to a server based on the queries corresponding to a dynamic event.

According to an embodiment, the method may further include generating a partial response for one or more portions of the queries based on a capability of a first electronic device and sharing at least one remaining portion of the queries with other electronic devices for generating a response for the at least one remaining portion of the queries, based on the first electronic device being capable of generating the partial response for the queries.

According to an embodiment, the method may include combining the response generated by the other electronic device(s) and the partial response generated by the first electronic device for generating the complete response.

According to an embodiment, the method may include determining the other electronic devices capable of generating the complete response for the queries, and transmitting (or redirecting) information available with the first electronic device and the queries to the other electronic devices capable of generating the complete response for the queries.

According to an embodiment, the method may include generating the complete response for the queries, within the IoT network, without communicating to a server, and providing the complete response to the user.

According to an embodiment of the disclosure, a method for controlling a first electronic device that manages a user query in an Internet of Things (IoT) network, the method may include receiving a first query from the user, identifying whether the received first query is a static event in which a complete response can be generated by the first electronic device or a dynamic event in which a complete response cannot be generated by the first electronic device, based on the first query being identified as the static event, processing the first query, and based on the first query being identified as the dynamic event, transmitting the first query to a second electronic device.

The identifying whether the first query is a static event or a dynamic event may include identifying one of a complete response to the first query, a partial response to the first query, and no response to the first query, based on capability parameters of the first electronic device, wherein the control method may further include, based on the first electronic device being identified to be capable of generating a complete response to the first query, the first query processed by the first electronic device to generate the complete response to the first query, based on the first electronic device being identified to be capable of generating a partial response to the first query, processing a portion with respect to the first query in order to generate a partial response with respect to the first query and transmitting a control signal requesting the second electronic device to process remaining portions with respect to the first query to the second electronic device in order to generate a remaining response with respect to the first query, and based on the first electronic device being identified to be capable of generating no response to the first query, transmitting a control signal requesting the second electronic device to process the first query to the second electronic device in order to generate a complete response with respect to the first query.

The control method may further include, based on the first electronic device being identified to be capable of generating a partial response to the first query, identifying the second electronic device capable of the remaining response with respect to the first query, and transmitting the first query to the identified second electronic device, based on functional parameters of a plurality of electronic devices included in the IoT network.

The control method may further include transmitting a control signal requesting to generate the remaining response with respect to the first query to the identified second electronic device, and transmitting a control signal requesting to transmit the remaining response with respect to the first query generated by the identified second electronic device to the first electronic device, to the identified second electronic device.

The control method may further include transmitting a control signal requesting to generate the remaining response with respect to the first query to the identified second electronic device, and transmitting a control signal requesting to transmit the remaining response with respect to the first query generated by the identified second electronic device to the first electronic device.

The control method may further include receiving the remaining response with respect to the first query from the second electronic device, generating a complete response with respect to the first query by combining the partial response with respect to the first query generated by the first electronic device and the remaining response with respect to the first query received from the second electronic device, and providing the generated complete response to the user.

The control method may further include, based on the user being identified to be within a threshold distance from the first electronic device, providing the complete response to the user.

The control method may further include, based on the first electronic device being identified to be capable of generating no response with respect to the first query, identifying the second electronic device capable of generating a complete response with respect to the first query, based on functional parameters of the plurality of electronic devices included in the IoT network, transmitting the first query and information available by the first electronic device to the identified second electronic device, transmitting a control signal requesting the second electronic device to process the first query to the second electronic device in order to generate the complete response with respect to the first query, based on the received first query and information available by the first electronic device, and providing the complete response to the user.

The control method may further include, based on the first electronic device being identified as not being capable of generating the complete response with respect to the first query, identifying the second electronic device capable of generating a complete response with respect to the first query, based on functional parameters of the plurality of electronic devices included in the IoT network; transmitting the first query and information corresponding to the first query to the identified second electronic device; transmitting, to the second electronic device, a control signal requesting the second electronic device to process the first query in order to generate the complete response with respect to the first query, based on the received first query and the information corresponding to the first query; and providing the complete response to the user.

The control method may further include, based on the second electronic device capable of generating the remaining response with respect to the first query being not identified according to the functional parameters of the plurality of electronic devices included in the IoT network, reporting information that the complete response with respect to the first query cannot be generated to a service provider, receiving updates of a service related to the first query from the service provider, upgrading functions based on the updates of the service received from the service provider, and generating the complete response to the first query based on the upgraded function.

The control method may further include, based on the second electronic device being unable to generate the remaining response with respect to the first query according to the functional parameters of the plurality of electronic devices included in the IoT network, reporting information that the complete response with respect to the first query cannot be generated to a service provider; receiving, by the first electronic device, updates of a service related to the first query from the service provider; upgrading, by the first electronic device, functions based on the updates of the service received from the service provider; and generating, by the first electronic device, the complete response to the first query based on the upgraded functions.

The control method may further include, based on the complete response with respect to the first query being identified no to be generated, requesting a second query related to the first query to the user, based on the upgraded functions, receiving the second query from the user, generating a complete response with respect to the second query using the upgraded functions, and providing the complete response with respect to the second query to the user.

The control method may further include, based on, after upgrading functions based on the updates of the service, a complete response with respect to the first query being identified as not being able to be generated, requesting, by the first electronic device, a second query related to the first query to the user, based on the upgraded functions; receiving, by the first electronic device, the second query from the user; generating, by the first electronic device, the complete response with respect to the second query using the upgraded functions; and providing, by the first electronic device, the complete response with respect to the second query to the user.

The function parameter may include at least one of a device type, a device identifier, a hardware specification, connection attributes, or service availability.

According to an embodiment of the disclosure, an electronic device that manages a user query in an Internet of Things (IoT) network, the device include a memory, and a processor coupled to the memory, wherein the processor is configured to receive a first query from the user, identify whether the received first query is a static event in which a complete response can be generated by the first electronic device or a dynamic event in which a complete response cannot be generated by the first electronic device, based on the first query being identified as the static event, process the first query; and based on the first query being identified as the dynamic event, transmit the first query to a second electronic device.

The processor may be configured to identify one of a complete response to the first query, a partial response to the first query, and no response to the first query, based on capability parameters of the first electronic device, based on the first electronic device being identified to be capable of generating a complete response to the first query, include the first query processed by the first electronic device to generate the complete response to the first query, based on the first electronic device being identified to be capable of generating a partial response to the first query, process a portion with respect to the first query in order to generate a partial response with respect to the first query and transmit a control signal requesting the second electronic device to process remaining portions with respect to the first query to the second electronic device in order to generate a remaining response with respect to the first query, and based on the first electronic device being identified to be capable of generating no response to the first query, transmit a control signal requesting the second electronic device to process the first query to the second electronic device in order to generate a complete response with respect to the first query.

The processor may be configured to, based on the electronic device being identified to be capable of generating the complete response to the first query, process the first query to generate the complete response to the first query, based on the electronic device being identified to be capable of generating the partial response to the first query, process a portion with respect to the first query in order to generate the partial response with respect to the first query and control the IoT communication interface to transmit, to the second electronic device, a control signal requesting the second electronic device to process one or more remaining portions with respect to the first query in order to generate a remaining response with respect to the first query, and based on the electronic device being identified as not being capable of generating the complete response to the first query, control the IoT communication interface to transmit, to the second electronic device, a control signal requesting the second electronic device to process the first query in order to generate a complete response with respect to the first query.

The processor may be configured to, based on the first electronic device being identified to be capable of generating a partial response to the first query, identify the second electronic device capable of the remaining response with respect to the first query, and transmit the first query to the identified second electronic device, based on functional parameters of a plurality of electronic devices included in the IoT network.

The processor may be configured to transmit a control signal requesting to generate the remaining response with respect to the first query to the identified second electronic device, and transmit a control signal requesting to transmit the remaining response with respect to the first query generated by the identified second electronic device to the first electronic device, to the identified second electronic device.

The processor may be configured to receive the remaining response with respect to the first query from the second electronic device, generate a complete response with respect to the first query by combining the partial response with respect to the first query generated by the first electronic device and the remaining response with respect to the first query received from the second electronic device, and provide the generated complete response to the user.

The processor may be configured to, based on the user being identified to be within a threshold distance from the first electronic device, provide the complete response to the user.

The processor may be configured to, based on the first electronic device being identified to be capable of generating no response with respect to the first query, identify the second electronic device capable of generating a complete response with respect to the first query, based on functional parameters of the plurality of electronic devices included in the IoT network, transmit the first query and information available by the first electronic device to the identified second electronic device, transmit a control signal requesting the second electronic device to process the first query to the second electronic device in order to generate the complete response with respect to the first query, based on the received first query and information available by the first electronic device, and provide the complete response to the user.

The processor may be configured to, based on the second electronic device capable of generating the remaining response with respect to the first query being not identified according to the functional parameters of the plurality of electronic devices included in the IoT network, report information that the complete response with respect to the first query cannot be generated to a service provider, receive updates of a service related to the first query from the service provider, upgrade functions based on the updates of the service received from the service provider, and generate the complete response to the first query based on the upgraded function.

The processor may be configured to, based on the complete response with respect to the first query being identified no to be generated, request a second query related to the first query to the user, based on the upgraded functions, receive the second query from the user, generate a complete response with respect to the second query using the upgraded functions, and provide the complete response with respect to the second query to the user.

According to an embodiment of the disclosure, a system for managing a user query in an Internet of Things (IoT) network, the system may include a first electronic device, and at least second electronic device, wherein the first electronic device receives a first query from the user, identifies whether the received first query is a static event in which a complete response can be generated by the first electronic device or a dynamic event in which a complete response cannot be generated by the first electronic device, based on the first query being identified as the static event, processes the first query, and based on the first query being identified as the dynamic event, transmits the first query to a second electronic device, and wherein the second electronic device is configured to, based on the first query corresponding to the dynamic event being received from the first electronic device, process the first query to generate a complete response with respect to the first query.

According to an embodiment, a method may include: receiving, by a first electronic device in an Internet of Things (IoT) network, a first query from a user; identifying, by the first electronic device, whether the first electronic device is capable of generating a complete response to the first query; based on identifying that the first electronic device is capable of generating the complete response to the first query, processing, by the first electronic device, the first query to generate the complete response to the first query, and transmitting, performing or outputting the generated complete response to the user; and based on identifying that the first electronic device is not capable of generating the complete response to the first query, transmitting, via the IoT network, the first query to a second electronic device in the IoT network that is capable of generating the complete response or a partial response to the first query.

The transmitting the first query to the second electronic device that is capable of generating the complete or the partial response to the first query may include: identifying one or more electronic devices in the IoT network that are within a vicinity threshold distance away from the first electronic device and that are capable of generating the complete response or the partial response to the first query; and transmitting the first query to one of the identified one or more electronic devices that are within the vicinity of the first electronic device.

The identifying whether the first electronic device is capable of performing the complete response to the first query may be based on capability parameters of the first electronic device.

The method may further include: based on the first electronic device being identified to be capable of generating only the partial response to the first query, processing a portion with respect to the partial response to generate the partial response with respect to the first query and transmitting a control signal, to the second electronic device, requesting that the second electronic device process one or more remaining portions with respect to the first query in order to generate a remaining response with respect to the first query, and based on the first electronic device being identified as not being capable of generating the complete response nor the partial response to the first query, transmitting a control signal, to the second electronic device, requesting the second electronic device to process the first query in order to generate the complete response with respect to the first query.

The method may further include: based on the first electronic device being identified to be capable of generating the partial response to the first query, identifying the second electronic device capable of generating the remaining response with respect to the first query, and transmitting the first query to the identified second electronic device, based on functional parameters of a plurality of electronic devices included in the IoT network.

The method may further include: transmitting a control signal requesting to generate the remaining response with respect to the first query to the identified second electronic device, and transmitting a control signal requesting to transmit the remaining response with respect to the first query generated by the identified second electronic device to the first electronic device.

The method may further include: receiving the remaining response with respect to the first query from the second electronic device; generating the complete response with respect to the first query by combining the partial response with respect to the first query generated by the first electronic device and the remaining response with respect to the first query received from the second electronic device; and providing the generated complete response to the user.

The method may further include: based on the user being identified to be within a threshold distance from the first electronic device, providing the complete response to the user.

The method may further include: based on the first electronic device being identified as not being capable of generating the complete response with respect to the first query, identifying the second electronic device capable of generating the complete response with respect to the first query, based on functional parameters of the plurality of electronic devices included in the IoT network; transmitting the first query and information made available by the first electronic device to the identified second electronic device; transmitting, to the second electronic device, a control signal requesting the second electronic device to process the first query in order to generate the complete response with respect to the first query, based on the received first query and information made available by the first electronic device; and providing the complete response to the user.

The method may further include: based on the first electronic device being identified as not being capable of generating the complete response with respect to the first query, identifying the second electronic device capable of generating a complete response with respect to the first query, based on functional parameters of the plurality of electronic devices included in the IoT network; transmitting the first query and information corresponding to the first query to the identified second electronic device; transmitting, to the second electronic device, a control signal requesting the second electronic device to process the first query in order to generate the complete response with respect to the first query, based on the received first query and the information corresponding to the first query; and providing the complete response to the user.

The method may further include: based on the second electronic device being unable to generate the remaining response with respect to the first query according to the functional parameters of the plurality of electronic devices included in the IoT network, reporting information that the complete response with respect to the first query cannot be generated to a service provider; receiving updates of a service related to the first query from the service provider; upgrading functions based on the updates of the service received from the service provider; and generating the complete response to the first query based on the upgraded functions.

The method may further include: based on the complete response with respect to the first query being identified as not being able to be generated, requesting a second query related to the first query to the user, based on the upgraded functions; receiving the second query from the user; generating the complete response with respect to the second query using the upgraded functions; and providing the complete response with respect to the second query to the user.

The capability parameters may include at least one of a device type, a device identifier, a hardware specification, connection attributes, or service availability.

According to an embodiment, an electronic device may include: an Internet of Things (IoT) communication interface configured to communicate with one or more other IoT devices over an IoT network; a memory; and a processor coupled to the memory, wherein the processor may be configured to: receive a first query from a user; identify whether the electronic device is capable of generating a complete response to the first query; based on identifying that the electronic device is capable of generating the complete response to the first query, process the first query to generate the complete response to the first query, and transmit, perform or output the generated complete response to the user; and based on identifying that the electronic device is not capable of generating the complete response to the first query, control the IoT communication interface to transmit, via the IoT network, the first query to a second electronic device in the IoT network that is capable of generating the complete response or a partial response to the first query.

The processor may be further configured to control the IoT communication interface to transmit the first query to the second electronic device that is capable of generating the complete response or the partial response to the first query by: identifying one or more electronic devices in the IoT network that are within a vicinity threshold distance away from the electronic device and that are capable of generating the complete response or the partial response to the first query; and controlling the IoT communication interface to transmit the first query to one of the identified one or more electronic devices that are within the vicinity of the electronic device.

The processor may be further configured to: identify one of the complete response to the first query, the partial response to the first query, or no response to the first query, based on capability parameters of the electronic device.

The processor may be further configured to: identify whether the electronic device is capable of performing the complete response to the first query based on capability parameters of the electronic device.

The processor may be further configured to, based on the electronic device being identified to be capable of generating the complete response to the first query, process the first query to generate the complete response to the first query, based on the electronic device being identified to be capable of generating the partial response to the first query, process a portion with respect to the first query in order to generate the partial response with respect to the first query and control the IoT communication interface to transmit, to the second electronic device, a control signal requesting the second electronic device to process one or more remaining portions with respect to the first query in order to generate a remaining response with respect to the first query, and based on the electronic device being identified as not being capable of generating the complete response to the first query, control the IoT communication interface to transmit, to the second electronic device, a control signal requesting the second electronic device to process the first query in order to generate the complete response with respect to the first query.

The processor may be further configured to, based on the electronic device being identified as being capable of generating the partial response to the first query, identify the second electronic device capable of the remaining response with respect to the first query, and control the IoT communication interface to transmit, to the identified second electronic device, the first query based on functional parameters of a plurality of electronic devices included in the IoT network.

The processor may be further configured to: control the IoT communication interface to transmit, to the identified second electronic device, one or more control signals requesting to generate the remaining response with respect to the first query, and requesting to transmit the remaining response with respect to the first query generated by the identified second electronic device to the electronic device.

The processor may be further configured to: receive the remaining response with respect to the first query from the second electronic device; generate the complete response with respect to the first query by combining the partial response with respect to the first query generated by the electronic device and the remaining response with respect to the first query received from the second electronic device; and provide the generated complete response to the user.

The processor is further configured to, based on the user being identified to be within a threshold distance from the electronic device, provide the complete response to the user.

According to an embodiment, an electronic device may include: an Internet of Things (IoT) communication interface configured to communicate with one or more other IoT devices over an IoT network; and a processor configured to: receive a first query from a user; identify whether the received first query is a static event in which a complete response is capable of being generated by the electronic device or a dynamic event in which the complete response is not capable of being generated by the electronic device; based on the first query being identified as the static event, process the first query; and based on the first query being identified as the dynamic event, control the IoT communication interface to transmit the first query to a second electronic device, from among the one or more other IoT devices.

The second electronic device may be configured to, based on the first query corresponding to the dynamic event being received from the first electronic device, process the first query to generate the complete response with respect to the first query.

According to an embodiment, an electronic device may include: an Internet of Things (IoT) communication interface configured to communicate with one or more other IoT devices over an IoT network; a second communication interface that is configured to communicate over the Internet; and a processor configured to: based on receiving a first query from a user: identify whether the electronic device is capable of generating a complete response to the first query; and based on identifying that the first electronic device is not capable of generating the complete response to the first query, control the IoT communication interface to transmit, via the IoT network, at least a portion of the first query to a second electronic device in the IoT network that is capable of generating the complete response or a partial response to the first query.

The processor may be further configured to: transmit the first query to the second electronic device that is capable of generating the complete or partial response to the first query by: identifying one or more electronic devices in the IoT network that are within a vicinity threshold distance away from the electronic device and that are capable of generating the complete or partial response to the first query; and transmitting, via the IoT communication interface, the first query to one of the identified one or more electronic devices that are within the vicinity of the electronic device.

BRIEF DESCRIPTION OF FIGURES

This method and system is illustrated in the accompanying drawings, throughout which like reference letters indicate corresponding parts in the various figures. The embodiments herein will be better understood from the following description with reference to the drawings, in which:

FIG. 3A to 3C are a flow diagram illustrating a method for providing a complete response for a first query of the user, according to an embodiment of the disclosure;

DETAILED DESCRIPTION OF INVENTION

Figure 1A:
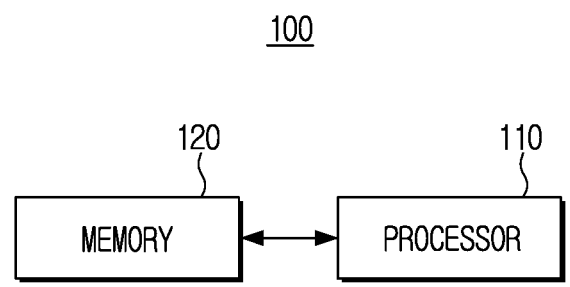
FIG. 1A is a block diagram illustrating an electronic device, according to an embodiment of the disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for managing queries of a user in an Internet of Things (IoT) network. The method may include receiving, by a first electronic device in the IoT network, a first query from the user. The method may include determining, by the first electronic device, that the first query corresponds to one of a static event and a dynamic event. The method may include performing, by the first electronic device, processing the first query, in response to identifying (or determining) that the first query corresponds to the static event.

Unlike existing methods and systems, the proposed method allows a first IoT device or a voice assistant (i.e. first electronic device) to redirect the query to a set of IoT devices for providing the response to the user, in response to detecting that the IoT device or the voice assistant is not capable of generating the response for the query of the user. Here, the redirect may be expressed as a redirect, and the redirect may be replaced with an expression such as 'transmit' or 'transmit again or retransmit'. In other words, the redirect may refer to an operation of sending received information to another device (e.g., "as is," with additional information, or with only a portion of). Depending on an embodiment, the redirect may refer to forwarding. At least one second IoT device (i.e. second electronic device) in the set of IoT devices generates the response for the query based on the capability of the at least one second IoT device. Further, the user may receive the response either from the voice assistant or one of the IoT device in the set of IoT devices based on an availability of the voice assistant or one of the IoT device in the vicinity of the user. Therefore, the method assures that a response for any kind of query of the user is provided, which improves a user experience of a user in interacting with IoT devices as well as the voice assistant.

Unlike existing methods and systems, the proposed method allows maintaining user's private data such as health data without having to communicate with the server for generating the response for the query. The proposed method allows communicating the user's private data within the IoT network for generating the response. Therefore, the proposed method allows to maintain a privacy of the user without exposing the user's private data to the server.

The proposed method allows the first electronic device and a second electronic device to store a relatively small amount of data related to the home environment such as an image of a debit card located over a floor. In response to receiving the query for providing the location of the debit card, the first electronic device can quickly provide the response including the location of the debit card without processing the query in the server and generating the response. Processing the query in the server and generating the response will comparatively takes more time to provide a response to a user with respect to providing a response based on the proposed method. Therefore, the proposed method allows the first electronic device or the second electronic device to provide the response to user with less latency (i.e., enhanced response timing).

Referring now to the drawings, and more particularly to FIGS. 1 through 19, there are shown preferred embodiments.

FIG. 1A is a block diagram illustrating an electronic device according to an embodiment of the disclosure.

Referring to FIG. 1A, electronic devices 100 and 200 may include memories 120 and 220, respectively, and processors 110 and 210, respectively.

The memories 120 and 220 may be implemented as internal memories such as Read-Only Memory (ROM) (e.g., electrically erasable programmable ROM (EEPROM)), Random Access Memory (RAM), etc. included in the processors 110 and 210, or may also be implemented as a separate memory from the processors. The memory 120 may be a different memory type from the memory type of memory 220. In an embodiment, the memories 120 and 220 may be implemented in the form of a memory embedded in the electronic devices 100 or 200 depending on the purpose of data storage, or may be implemented in the form of a memory that can be attached or detached to the electronic devices 100 or 200. For example, data for driving the electronic devices 100 and 200 may be stored in the memory embedded in the electronic devices 100 and 200, and data for extending function of the electronic devices 100 and 200 may be stored in the memory that can be attached or detached to the electronic devices 100 and 200.

Meanwhile, the memory embedded in the electronic devices 100 and 200 may be implemented at least one of the form of volatile memory (e.g., dynamic RAM (DRAM), static RAM (SRAM), synchronous dynamic RAM (SDRAM), etc.), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g. NAND flash or NOR flash, etc.), a hard drive, or a solid state drive (SSD)), and the memory that is detachable to the electronic devices 100 or 200 may be implemented in the form of a memory card (e.g., compact flash (CF), secure digital (SD), micro secure digital (Micro-SD), mini secure digital (Mini-SD), extreme digital (xD), multi-media card (MMC), etc.), external memory that can be connected to a USB port (e.g., USB memory) or the like.

The processors 110 and 210 may perform overall control operations of the electronic devices 100 and 200. Specifically, the processors 110 and 210 may function to control the overall operation of the electronic devices 100 and 200.

The processors 110 and 210 may communicate with various external devices using a communication interface. Here, the external device may include a display device such as a television, an image processing device such as a set-top box, an external server, a control device such as a remote control, a sound output device such as an ultra high frequency (UHF) radio wave device (e.g., a Bluetooth® speaker), a lighting device, a smart light bulb, a smart plug, a smart vacuum cleaner, a smart refrigerator, a server such as an IoT home manager, or the like.

The processors 110 and 210 may be implemented as a digital signal processor (DSP) that processes digital signals, a microprocessor, or a time controller (TCON), but are not limited thereto, and include one or more of a central processing unit (CPU), microcontroller unit (MCU), micro processing unit (MPU), controller, application processor (AP), graphics-processing unit (GPU), or communication processor (CP)), and an Advanced RISC (reduced instruction set computing) Machine (ARM) processor, or may be defined in a corresponding term. In addition, the processors 110 and 210 may be configured as System on Chip (SoC) or large scale integration (LSI) with a built-in processing algorithm, or implemented in the form of a field programmable gate array (FPGA). In addition, the processors 110 and 210 may perform various functions by executing computer executable instructions stored in a memory.

Figure 1B:
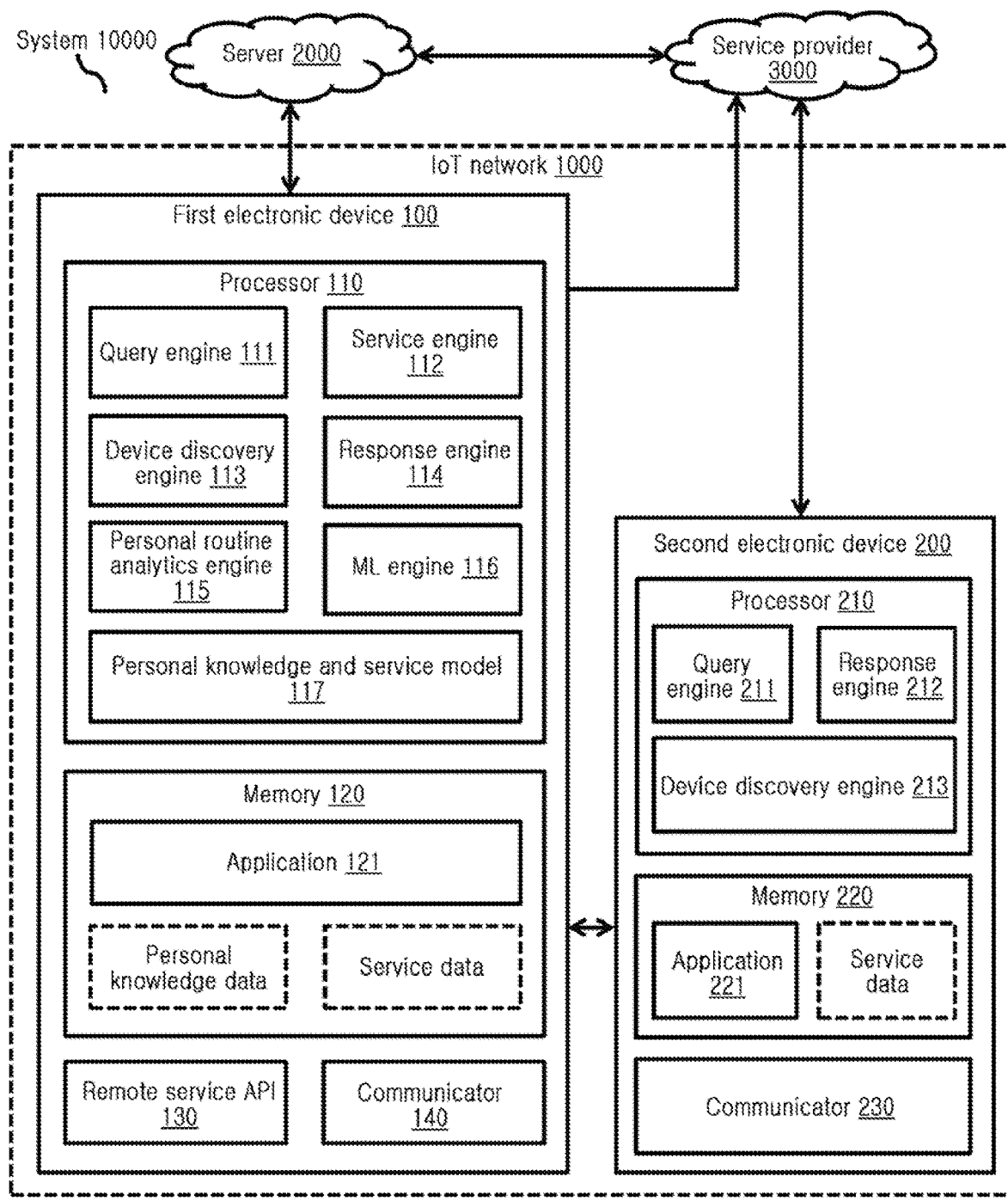
FIG. 1B is a block diagram of a system for managing queries of a user in an Internet of Things (IoT) network using a first electronic device, according to an embodiment of the disclosure.

FIG. 1B is a block diagram of a system 10000 for managing queries of a user in an IoT network 1000 using a first electronic device 100, according to an embodiment. An IoT system is a system of interrelated computing devices, mechanical and digital machines provided with Unique Identifiers (UIDs) and an ability to transfer data over a network, where IoT devices are interconnected via a same network called the IoT network 1000. Examples for a query are, but not limited to a voice query, a text query, a query in the form of a gesture and the like. In an embodiment, the system 10000 may include an IoT network 1000, a server 2000 and a service provider 3000. The server 2000 may provide a response to the first electronic device 100 when the server 2000 is able to process a query and generate the response upon receiving the query from the first electronic device 100. The system 10000 that includes the IoT network 1000 may also include the first electronic device 100 and at least one second electronic device 200, where the at least one second electronic device 200 is connected to the first electronic device 100. Examples for the first electronic device 100 and the second electronic device 100 are, but not limited to a smartphone, a tablet computer, a personal computer (PC), a desktop computer, a personal digital assistance (PDA), a voice assistant, an Internet of Things (IoT) device and the like. The at least one second electronic device 200 may be connected to the service provider 3000. The first electronic device 100 may be connected to the server 2000 and the service provider 3000. Here, the service provider may refer to an external server that manages a plurality of devices that provide various services to users. The service provider may communicate with a plurality of devices and exchange various information with the plurality of devices. Meanwhile, according to implementation examples, the service provider may refer to a host device among the plurality of devices. One of the plurality of devices may be implemented to perform a management role.

In an embodiment, the first electronic device 100 may include a processor 110, a memory 120, a remote service Application Programming Interface (API) 130 and a communication interface 140. In an embodiment, the processor 110 may include a query engine 111, a service engine 112, a device discovery engine 113, a response engine 114, a personal routine analytics engine 115, a (Machine Learning) ML engine 116, and a personal knowledge and service model 117. The processor 110 is configured to execute instructions stored in the memory 120. The memory 120 may include at least one application 121. The memory 120 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory 120. In certain examples, a non-transitory storage medium may store data that can, over time, change (e.g., in Random Access Memory (RAM) or cache).

The communication interface 140 may be configured to communicate internally between hardware components in the electronic device 100. Further, the communication interface 140 may be configured to facilitate the communication for the electronic device 100 with the at least one second electronic device 200, the server 2000 and the service provider 3000.

In an embodiment, the at least one second electronic device 200 may include a processor 210, a memory 220, and a communication interface 230. In an embodiment, the processor 210 may include a query engine 211, a response engine 212, and a device discovery engine 213. The processor 210 may be configured to execute instructions stored in the memory 220. The memory 120 may include at least one application 221. The memory 220 may store service data of the at least one second electronic device 200. The memory 220 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory 220 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 220 can be configured to store larger amounts of information than the memory 220. In certain examples, a non-transitory storage medium may store data that can, over time, change (e.g., in Random Access Memory (RAM) or cache). The remote service API 130 may allow the at least one application 121 to access the pre-defined service.

The communication interface 230 may be configured to communicate internally between hardware components in the at least one second electronic device 200. Further, the communication interface 230 may be configured to facilitate the communication for the at least one second electronic device 200 with the first electronic device 100 and the service provider 3000.

The personal routine analytics engine 115 may monitor the activities performing using the first electronic device 100 and the at least one second electronic device 200 by the user or tasks given to the first electronic device 100 and the at least one second electronic device 200 to perform the activities. Examples for the activities are switching on a television, cooking food using an oven, etc. Further, the personal routine analytics engine 115 determines personal user data of the user may include at least a user profile (e.g. name of user, age of user, and the like), a device usage pattern of the user, a lifestyle data of the user, routines data (e.g. food routine data, TV watching routine data, etc.) of the user, and entertainment data (e.g. playing video games, watching game cannels) of the user. Further, the personal routine analytics engine 115 may generate the personal knowledge data of the user by performing at least one of: clustering, personal user data analysis and forecasting, pattern mining, and prediction modeling on the personal user data.

In an embodiment, the personal routine analytics engine 115 may generate the personal knowledge data of the user based on general knowledge data (refer to FIG. 4) obtained from the server 2000 and the personal user data. The personal routine analytics engine 115 may generate the personal knowledge data by creating a relationship with the user and the activities, the entertainments, services providing by the first electronic device 100 or the second electronic device 200, the lifestyle data, and user preferences, where the personal routine analytics engine 115 determines the user preference from the device usage pattern and the user profiles. Further, the personal routine analytics engine 115 may generate the personal knowledge and service model 117 using the personal knowledge data of the user. The personal knowledge and service model 117 may include one or more of: a knowledge graph querying service, a recommendation service, an alternate suggestion service, a cluster routine service, a lifestyle prediction model, a food plan creation model, an entertainment prediction model, etc. In an embodiment, the personal routine analytics engine 115 may generate the personal knowledge and service model 117 based on a general knowledge and service model (refer to FIG. 4) obtained from the server 2000 and the personal knowledge data.

The first electronic device 100 may be configured to receive a first query from the user. In an embodiment, the query engine 111 may receive the first query from the user. In an embodiment, the first electronic device 100 may include an acoustic sensor to receive the first query as an audio signal, where a microphone is an example for the acoustic sensor. Further, the acoustic receiver may provide the first query as an electric signal to the query engine 111. The query engine 111 may perform Automated Speech Recognition (ASR) and Natural Language Processing (NLP) on the query to determine an intent of the query. Unlike existing methods and systems, the first electronic device 100 may reduce a latency in determining the intent of the query by performing the ASR and the NLP on the query within the first electronic device 100 without sending the query to the server 2000. The first electronic device 100 may be configured to identify that the first query corresponds to a static event or a dynamic event. The static event refers to queries that can be resolved by a device to which an utterance is given. For example, the user asks to a TV, "Turn on my TV", where the TV has the capability to turn on the TV. The dynamic event may refer to an event that cannot be resolved only with information included in the first electronic device 100 in solving queries and obtaining a response to the user. Here, it may be necessary to receive information through at least one device (the other device that is different from the first electronic device 100) among a plurality of devices included in the IoT network or an external server in order to resolve the query for the dynamic event.

According to an embodiment, the first electronic device 100 may generate a complete response to the first query using the other device included in the IoT network. A detailed description of this is described below with reference to FIG. 20.

According to another embodiment, the first electronic device 100 may generate a complete response to the first query using an external server. The first electronic device 100 may transmit the first query to the server 2000, and the server 2000 may analyze the first query transmitted by the first electronic device 100 to obtain information on the part that cannot be resolved by the first electronic device 100. In addition, the obtained information may be transmitted to the first electronic device 100. Here, the first electronic device 100 may generate a response based on information received from the server 2000. Meanwhile, according to an implementation embodiment, the first electronic device 100 may transmit the first query and a partial response to the first query to the server 2000. In addition, the server 2000 may obtain necessary information by analyzing a part that has not been resolved by the partial response with respect to the received first query, and generate a complete response based on the obtained information, the first query received from the first electronic device 100, and the partial response. In addition, the server 2000 may transmit the generated complete response to the first electronic device 100.

In one embodiment, the first query may correspond to a static event when at least one response can be generated for the first query within the IoT network without communicating with the server 2000. In one embodiment, the first query corresponds to a dynamic event when communication with the server 2000 is required to generate at least one response to the first query. In one embodiment, the query engine 111 determines that the first query corresponds to the static event or the dynamic event. The first electronic device 100 is configured to process the first query and transmit the first query to the server 2000 in order to generate a response to the first query when the first query is identified as corresponding to the dynamic event. In one embodiment, the query engine 111 may process the first query and, based on identifying that the first query corresponds to the dynamic event, transmit the first query to the server 2000 to generate a response to the first query. The first electronic device 100 may be configured to process the first query based on identifying that the first query corresponds to the static event. In one embodiment, the response engine 114 may process the first query based on identifying that the first query corresponds to the static event.

In another embodiment, the first electronic device 100 may be configured to determine whether the first electronic device 100 is capable of generating a complete response for the first query, a partial response for at least one portion of the first query or a no response (e.g., NoResponse, or No-Action Response) for the first query based on capability parameters (or function parameters) of the first electronic device 100. The partial response is a response that may be provided by the first electronic device 100 as a part of the first query. For example, consider the first query transmitted to the fridge, where the first query recites: "Provide me recipes with ingredients inside based on Mom's health". In the first query, "ingredients inside" is assumed to mean inside the fridge and is a partial query which can be responded to by the fridge itself, whereas identifying Mom's health data may not be within the capabilities of the fridge, but may, as an example, be provided by the wearable device.

The capability parameter may indicate whether the first electronic device 100 is capable of resolving the query and generating the response. Based on no response or a "no-action" response being provided by the server 2000 for the query, then the first electronic device 100 may be identified as not being capable of resolving the query. For example, consider the query is "What is inside the fridge?", where the fridge is capable of resolving this query, but the TV cannot resolve this query without an assistance of an edge device (e.g. voice assistant). In an embodiment, a service data of the first electronic device 100 is stored at the memory 120, where the service data of the first electronic device 100 may include values of capability parameters of the first electronic device 100, where the values of capability parameters are entered in a mapping table. The capability parameters may include a device type, a device identifier, a hardware specification, connection properties and availability of pre-defined services. The device type may include a home edge computing device (e.g. voice assistant) and the IoT device (e.g. Fridge). The device identifier may include a name of the device with a location information of the device, a unique alphanumerical code of the device and the like. The hardware specification may include an availability of Graphics Processing Unit (GPU), speed of Central Processing Unit (CPU) and GPU, a number of cores (small core as well as large core) in the CPU and GPU, an amount of RAM available and an amount of ROM available. The connection properties may include a private Internet protocol (IP) address, a port and/or a public IP address.

In an embodiment, the pre-defined services may be services that are used by the user frequently, where the pre-defined services may include at least one of a shopping service, an IoT service (e.g. fridge service, TV service, mobile service and cooking service), a health service, a reminder service, a multimedia playing service, an appointment service, a speaker service and a secure financial transaction service.

The fridge service may allow the first electronic device 100 (or the at least one second electronic device 200) to accept a connection from the allowed devices in the at least one second electronic device 200. Further, the fridge service allows the first electronic device 100 (or the at least one second electronic device 200) to resolve the query and provide a response with details about a Fridge-hub. The fridge service allows the first electronic device 100 (or the at least one second electronic device 200) to provide responses such as details of items (e.g. grocery) inside the fridge, a user's favorite recipes, information of frequently bought or brought to the fridge, expiry information of one or more items, meals planned etc. In an example scenario, the first electronic device 100 suggests a grocery list to a user when the shopping service is available at the first electronic device 100, upon receiving the query "Suggest the grocery list" from the user.

The speaker service allows the first electronic device 100 to fetch details of the at least one second electronic device 200 for device discovery. Further, the speaker service allows the first electronic device 100 to receive the query from the at least one second electronic device 200 and resolve.

The TV service allows the first electronic device 100 (or the at least one second electronic device 200) to accept connection from allowed devices in the at least one second electronic device 200. Further, the TV service allows the first electronic device 100 (or the at least one second electronic device 200) to resolve the query received and provide responses with details about the TV such as details of a TV program currently being telecast, a user's favorite channel, or may switch on the TV with the favorite channel etc. In an example scenario, the first electronic device 100 controls a television (TV) to operate from idle state to active state when the IoT service is available at the first electronic device 100, upon receiving the query "Turn on the TV" from the user.

The mobile service allows the first electronic device 100 (or the at least one second electronic device 200) to accept connection from the allowed devices in the at least one second electronic device 200. Further, the mobile service allows the first electronic device 100 (or at least one second electronic device 200) to resolve the query received and provide responses with details about smartphone such as details of media data queried, a user's favorite playlist etc.

The health service allows the first electronic device 100 (or the at least one second electronic device 200) to accept connection from the allowed devices in the at least one second electronic device 200. Further, the health service allows the first electronic device 100 (or the at least one second electronic device 200) to resolve the query received and provide responses with the details about health data such as current health data, alert on all the connected devices (i.e. the at least one second electronic device 200) on an emergency etc. In an example scenario, the first electronic device 100 provides a health summary of the user based on a health data (e.g. sugar level in blood, blood pressure level, cholesterol level in blood, heart rate, calories intake, calories burnt, frequently followed activities, etc.) of the user when the health service is available at the first electronic device 100, upon receiving the query "Give my health summary" from the user.

The cooking service allows the first electronic device 100 (or the at least one second electronic device 200) to accept connection from the allowed devices in the at least one second electronic device 200. Further, the cooking service allows the first electronic device 100 (or the at least one second electronic device 200) to resolve the query received and provide responses with the details about an oven such as a current status of a food inside the oven, settings configured at the oven to prepare the food.

In an example scenario, the first electronic device 100 may provide a reminder to the user through a nearby device (i.e. the first electronic device 100 or the at least one second electronic device 200) of the user when the reminder service is available at the first electronic device 100, upon receiving the query to remind the user. In an example scenario, the first electronic device 100 may configure the TV to play songs at the TV by sending the songs to the TV when the multimedia playing service is available at the first electronic device 100, upon receiving the query "play songs at TV" from the user. In an example scenario, the first electronic device 100 provides information about available appointments of a doctor when the appointment service is available at the first electronic device 100, upon receiving the query "Show me doctor's appointment" from the user.

In an example scenario, the first electronic device 100 may provide a balance in a wallet of a smartphone of the user without forwarding the query to server 2000 for generating the response, when the secure financial service is available at the first electronic device 100, upon receiving the query "Show mobile wallet balance" from the user. In an embodiment, the service data may include the device identifier of the at least one second electronic device 200 capable of providing the response for the query, the device type of the at least one second electronic device 200, the hardware specification of the at least one second electronic device 200 and the connection properties of the at least one second electronic device 200 with the IoT network 1000.

In an embodiment, the service engine 112 may determine whether the first electronic device 100 is capable of generating the complete response for the first query or the partial response for the at least one portion of the first query or the no response for the first query based on the capability parameters of the first electronic device 100. When the second electronic device 200 is newly added to the IoT network 1000, the second electronic device 200 may broadcast capability parameters of the second electronic device 200 across the IoT network 100. Further, the service engine 112 may update the mapping table by entering the capability parameters of the second electronic device 200 newly added to the IoT network 1000. When the second electronic device 200 gets disconnected from the IoT network 1000, then the service engine 112 updates the mapping table by removing the entry of the capability parameters of the second electronic device 200 from the mapping table.

The first electronic device 100 is configured to process the first query for generating the complete response and providing the complete response to the user, when the first electronic device 100 is capable of generating the complete response. In an embodiment, the response engine 114 generates the at least one response by using the pre-defined services and provides the at least one response to the user, when the first electronic device 100 is capable of generating the complete response. In an embodiment, the response engine 114 generates the at least one response based on the personal knowledge data of the user using services and models available at the personal knowledge and service model 117. In an embodiment, the first electronic device 100 may include at least one of a display, a speaker, a notification light(s) and the like, to deliver the response to the user. In an embodiment, the response engine 114 provides the response to the user in form of a visual response through the display.

In an embodiment, the response engine 114 provides the response in the form of an audio response through the speaker. In an embodiment, the response engine 114 provides the at least one response to the user when the user is in the vicinity of the first electronic device 100. The "vicinity of" may mean within a certain radius of, such as, within 10 feet, or within 50 feet. However, 10 feet and 50 feet are merely examples and any threshold for the vicinity radius may be used. In an embodiment, the response engine 114 sends the complete response to the at least one second electronic device 200 when the user is in the vicinity of the at least one second electronic device 200. The response engine 212 receives the complete response from the first electronic device 100 and provides the complete response to the user. In an embodiment, the at least one second electronic device 200 may include at least one of a display, a speaker, a notification light(s) and the like, to provide the response to the user. In an embodiment, the response engine 212 provides the response in the form of the visual response through the display. In an embodiment, the response engine 212 may deliver the response in the form of the audio response through the speaker.

The first electronic device 100 may be configured to determine the at least one second electronic device 200 capable of generating the complete response for the first query based on the capability parameters of the at least one second electronic device 200, when the first electronic device 100 is not capable of providing a complete response. In an embodiment, a service data of the at least one second electronic device 200 is stored at the memory 220, where the service data of the at least one second electronic device 200 may include values of the capability parameters of the at least one second electronic device 200.

In an embodiment, the service engine 112 may determine that the first electronic device 100 is not capable of generating a complete response for the first query, when the first electronic device 100 does not process the first query or does not generate the complete response or the partial response for the first query. In another embodiment, the service engine 112 determines that the first electronic device 100 is not capable of generating a response for the first query in response to receiving a no response message from the server 2000. The device discovery engine 113 determines the at least one second electronic device 200 capable of generating the complete response for the first query based on the capability parameters of the at least one second electronic device 200, when the first electronic device 100 is not capable of providing the response. In an embodiment, the device discovery engine 113 uses the remote service API 130 to discover the second electronic device 200 in the IoT network 1000 that is capable of providing a response.

The device discovery engine 113 identifies the device identifier, the device type, the public IP address, the private IP address and the port of the at least one second electronic device 200 and establishes a connection session using an IP address of the at least one second electronic device. The device discovery engine 113 may use one or more of: secure on-boarding, certificates, Authentication, Authorization and Accounting (AAA) methods, encryption/decryption of the message protocols, and so on to for establishing a secure connection with the at least one second electronic device 200. The device discovery engine 113 discovers a connection status of the at least one second electronic device 200 with the IoT network 1000 at each moment of time (e.g. every 1 second). The device discovery engine 113 may update an availability of at least one second electronic device on the IoT network 1000. In an embodiment, the device discovery engine 113 may determine the availability of the at least one second electronic device 200 by communicating to the device discovery engine 213. In an embodiment, the device discovery engine 213 may determine an availability of the first electric device 100 by communicating to the device discovery engine 113. In an embodiment, the device discovery engine 213 of one second electronic device 200 may determine an availability of other second electronic devices by communicating to a device discovery engine of the other second electronic devices.

The first electronic device 100 may be configured to process the at least one portion of the first query to generate the partial response, and generate a response for at least one remaining portion of the first query using at least one second electronic device 200, when the first electronic device 100 is capable of generating the partial response for the first query. In an embodiment, the query engine 111 processes the at least one portion of the first query to generate the partial response, when the first electronic device 100 is capable of generating the partial response for the first query. Further, the response engine 114 generates the response for at least one remaining portion of the first query using the at least one second electronic device 200.

In another embodiment, the first electronic device 100 may be configured to identify the at least one second electronic device 200 that is capable of generating the response for the at least one remaining portion of the first query based on the capability parameters of the at least one second electronic device 200. In an embodiment, device discovery engine 113 identifies the at least one second electronic device 200 that is capable of generating the response for the at least one remaining portion of the first query based on the capability parameters of the at least one second electronic device 200. The first electronic device 100 may be configured to redirect the first query to the at least one second electronic device 200. In an embodiment, the query engine 111 may redirect the first query to the at least one second electronic device 200. The at least one second electronic device 200 may be configured to receive the first query redirected by the query engine 111. In an embodiment, the query engine 211 receives the first query redirected by the query engine 111. The at least one second electronic device 200 may be configured to generate the response for the at least one remaining portion of the first query.

In an embodiment, the response engine 212 may generate the response for the at least one remaining portion of the first query. In an embodiment, the response engine 212 may generate the response for the at least one remaining portion of the first query based on the personal knowledge data of the user using services and models available at the personal knowledge and service model 117. The at least one second electronic device 200 may be configured to send the response for the at least one remaining portion of the first query to the first electronic device 100. In an embodiment, the response engine 212 may transmit the response for the at least one remaining portion of the first query to the first electronic device 100. The first electronic device 100 may be configured to receive the response for the at least one remaining portion of the first query. In an embodiment, the response engine 114 receive the response for the at least one remaining portion of the first query.

The first electronic device 100 may be configured to generate the complete response for the first query by combining the partial response generated by the first electronic device 100 and the response received from the at least one second electronic device 200. In an embodiment, the response engine 114 may generate the complete response for the first query by combining the partial response generated by the first electronic device 100 and the response received from the at least one second electronic device 200. The first electronic device 100 may be configured to provide the complete response to the user. In an embodiment, the response engine 114 may provide the complete response to the user.

In another embodiment, the first electronic device 100 may be configured to redirect the first query and information available with the first electronic device 100 to the at least one second electronic device 200 capable of generating the complete response for the first query, when the first electronic device 100 is not capable of generating a response for the first query. Examples for the information available with the first electronic device 100 are, but not limited to, a device configuration of an oven used to cook a cake, ingredients available in a fridge, individuals detected in a surveillance camera system and the like. In an embodiment, the query engine 111 may redirect the first query and the information available with the first electronic device 100 to the at least one second electronic device 200 capable of generating the complete response for the first query, when the first electronic device 100 is not capable of generating the response for the first query. The query engine 111 may send the first query to the at least one second electronic device 200 based on the device identifier of the at least one second electronic device 200.

For example, it may be assumed that first information and the second electronic device 200 may be required to generate at least one complete response to the first query, and the first electronic device 100 stores only the first information. Since the first electronic device 100 stores only the first information, it may be identified that the complete response to the first query may not be provided. Specifically, the first electronic device 100 may generate no response to the first query. Here, the first electronic device 100 may redirect the first query redirected to at least one second electronic device 200 capable of providing a complete response for the first query. According to an embodiment, the first electronic device may refer to the first electronic device as a single device or as a device system including the first electronic device and an external device connected to the first electronic device. Specifically, the first electronic device 100 or the external device connected to the first electronic device 100 may identify a device storing the second information. Here, when the first electronic device 100 or the external device connected to the first electronic device 100 identifies the second electronic device 200, the first electronic device 100 or the external device connected to the first electronic device 100 may identify whether the second electronic device 200 stores only the second information or both the first information and the second information. Based on the second electronic device 200 storing only the second information, the first electronic device 100 or the external device connected to the first electronic device 100 may determine to transmit the first information and the first query to the second electronic device 200. The first electronic device 100 may not generate a complete response, but may store the first information necessary to generate the complete response. Accordingly, the first information stored in the first electronic device 100 may be information made available by the first electronic device. Meanwhile, based on identifying that the second electronic device 200 stores not only the second information but also the first information, the first electronic device 100 or the external device connected to the first electronic device 100 may not transmit the first information to the second electronic device 200, but transmit only the first query to the second electronic device 200.

Meanwhile, the second electronic device 200 may generate a complete response to the first query based on the received first information and the stored second information. Here, when the second electronic device 200 generates the complete response to the first query, the second electronic device 200 may directly provide the generated complete response to the user, or indirectly provide it to the user through the first electronic device 100 or the external device connected to the first electronic device 100. For example, when the second electronic device 200 may include a speaker capable of providing a complete response to the user, or a display, the second electronic device 200 may directly provide the complete response to the user. However, when the second electronic device 200 does not include both the speaker capable of providing a complete response to a user, and the display, the second electronic device 200 may provide the complete response to the other device including the speaker capable of providing a complete response to a user, and the display.

For example, the second electronic device 200 may identify a device including at least one of the speaker or the display, and transmit a complete response to the identified device.

For another example, the second electronic device 200 may transmit a control command requesting to identify a device including at least one of the speaker or the display to an external device connected to the second electronic device 200. The external device may identify a device capable of providing a complete response to the user by receiving the transmitted control command available by the second electronic device 200. Here, an identification target device may be a device located within a critical distance from the user and may be a device including at least one of the speaker or the display. When the external device identifies a device capable of providing a complete response to the user, the second electronic device 200 may directly transmit the complete response to the identified device or indirectly transmit the complete response to the identified device through the external device.

The at least one second electronic device 200 may be configured to receive the first query redirected by the first electronic device 100 and the information available with the first electronic device 100. In an embodiment, the query engine 211 receive the first query redirected by the first electronic device 100 and the information available with the first electronic device 100. The at least one second electronic device 200 may be configured to generate the complete response for the first query. In an embodiment, the response engine 212 generates the complete response for the first query. In an embodiment, the response engine 212 generates the complete response based on the personal knowledge data of the user using services and models available at the personal knowledge and service model 117. The at least one second electronic device 200 may be configured to provide the complete response to the user. In an embodiment, the response engine 212 provides the complete response to the user. In an embodiment, the response engine 212 provides the complete response to the user when the user is in vicinity to the at least one second electronic device 200.

In another embodiment, the at least one second electronic device 200 may be configured to send the complete response to the first electronic device 100. In an embodiment, the response engine 212 sends the complete response to the first electronic device 100. The first electronic device 100 may be configured to receive the complete response generated by the at least one second electronic device 200. In an embodiment, the response engine 114 receives the complete response generated by the at least one second electronic device 200. The first electronic device 100 may be configured to provide the complete response received from the at least one second electronic device 200 to the user. In an embodiment, the response engine 114 provides the complete response received from the at least one second electronic device 200 to the user. In an embodiment, the first electronic device 100 provides the complete response received from the at least second electronic device 200 to the user when the user is in vicinity to the first electronic device 100.

Unlike existing methods and system, the first electronic device 100 maintain user's private data such as health data, user profile information, bank account information without being communicate with the server 2000 for generating the response for the query. The first electronic device 100 communicates the user's private data with the at least one second electronic device 200 for generating the response. Therefore, the proposed method maintains privacy of the user data and provide security to the data without being exposed the user's private data to the server 2000. In an example scenario, an image of a debit card of the user may be captured by a robotic vacuum cleaner (i.e. the first electronic device 100). The robotic vacuum cleaner process the image data within the robotic vacuum cleaner up to 3 layers. The robotic vacuum cleaner sends last 2 layer of the image data to server 2000, where the last 2 layer incudes less information about the debit card. The robotic vacuum cleaner does not send the $1^{st}$ layer of image data that may include more information about the debit card to maintain privacy of the user and security of the data. The second electronic device 200 uses Keras code to determine each layers in the image data, where the Keras code is given below:

L1=Dense (64, activation='relu')
    L2=Dense (64, activation='relu')
    L3=Dense (10, activation='softmax')
    input1=Input (shape=(784,)) #input1 is a input tensor
    O1=L1(input1) #O1 is an intermediate tensor
    Model1=Model(input1, L3 (L2(L1(input1)
    Input2=Input(shape=(64,))
    model2=Mode(input2, L3 (L2(input2)))

where L1, L2 and L3 are the first layer, the second layer and the third layer respectively.

The first electronic device 100 may be configured to report the first query, for which the first electronic device 100 may be incapable of generating the complete response or the response for the at least one portion of the first query, to a service provider 3000. In an embodiment, the query engine 111 reports the first query, for which the first electronic device 100 is incapable of generating the complete response or the response for the at least one portion of the first query, to the service provider 3000. In an embodiment, the query engine 111 reports the first query, for which the first electronic device 100 is capable of generating the no response for the first query, to the service provider 3000. The first electronic device 100 may be configured to receive updates of service related to the first query from the service provider 3000. In an embodiment, the service engine 112 receive updates of service related to the first query from the service provider 3000. The first electronic device 100 may be configured to upgrade capabilities based on the updates of the service received from the service provider 3000. In an embodiment, the service engine 112 upgrade the capabilities of the first electronic device 100 based on the updates of the service received from the service provider 3000. In an embodiment, the service engine 112 updates the values of the capability parameters in the service data, in response to upgrading the capabilities of the first electronic device 100.

The first electronic device 100 may be configured to receive a second query from the user, where the second query is related to the first query. In an embodiment, the query engine 111 receives the second query from the user. Further, the query engine 111 determines that second query is related to first query when the capability required to generate the complete response for the second query and the first query is same. The first electronic device 100 may be configured to generate the complete response for the second query using the upgraded capabilities. In an embodiment, the response engine 114 generates the complete response for the second query using the upgraded capabilities.

The first electronic device 100 may be configured to provide the complete response for the second query to the user. In an embodiment, the response engine 114 provides the complete response for the second query to the user. In an embodiment, the response engine 114 provides the complete response for the second query to the user when the user is in vicinity to the first electronic device 100. In an embodiment, the response engine 114 provides the complete response to the user through the at least one second electronic device 200 when the user is in vicinity to the at least one second electronic device 200.

The ML engine 116 provides the remote service API 130 for performing inference and recognition of the personal user data using a distributed neural network based on at least one second electronic device 200 and the pre-defined services supported by each second electronic device 200. The ML engine 116 learns of user behavior and the device usage pattern of the user and updates the personal knowledge data based on the user preference to provide personalized service recommendations to the user.

In an embodiment, the ML engine 116 provides the personal knowledge data to the response engine 114 or the response engine 212 for generating the complete response. The response engine 114 or the response engine 212 correlates the complete response with the personal knowledge data. Further, the response engine 114 or the response engine 212 provides the complete response to the user based on the correlation. Therefore, the user receives a personalized response.

Although the FIG. 1 shows the hardware components of the system 10000 but it is to be understood that other embodiments are not limited thereon. In other embodiments, the system 10000 may include less or more number of components. Further, the labels or names of the components are used only for illustrative purpose and does not limit the scope of the invention. One or more components can be combined together to perform same or substantially similar function for managing the voice queries in the IoT network 1000.

Figure 2:
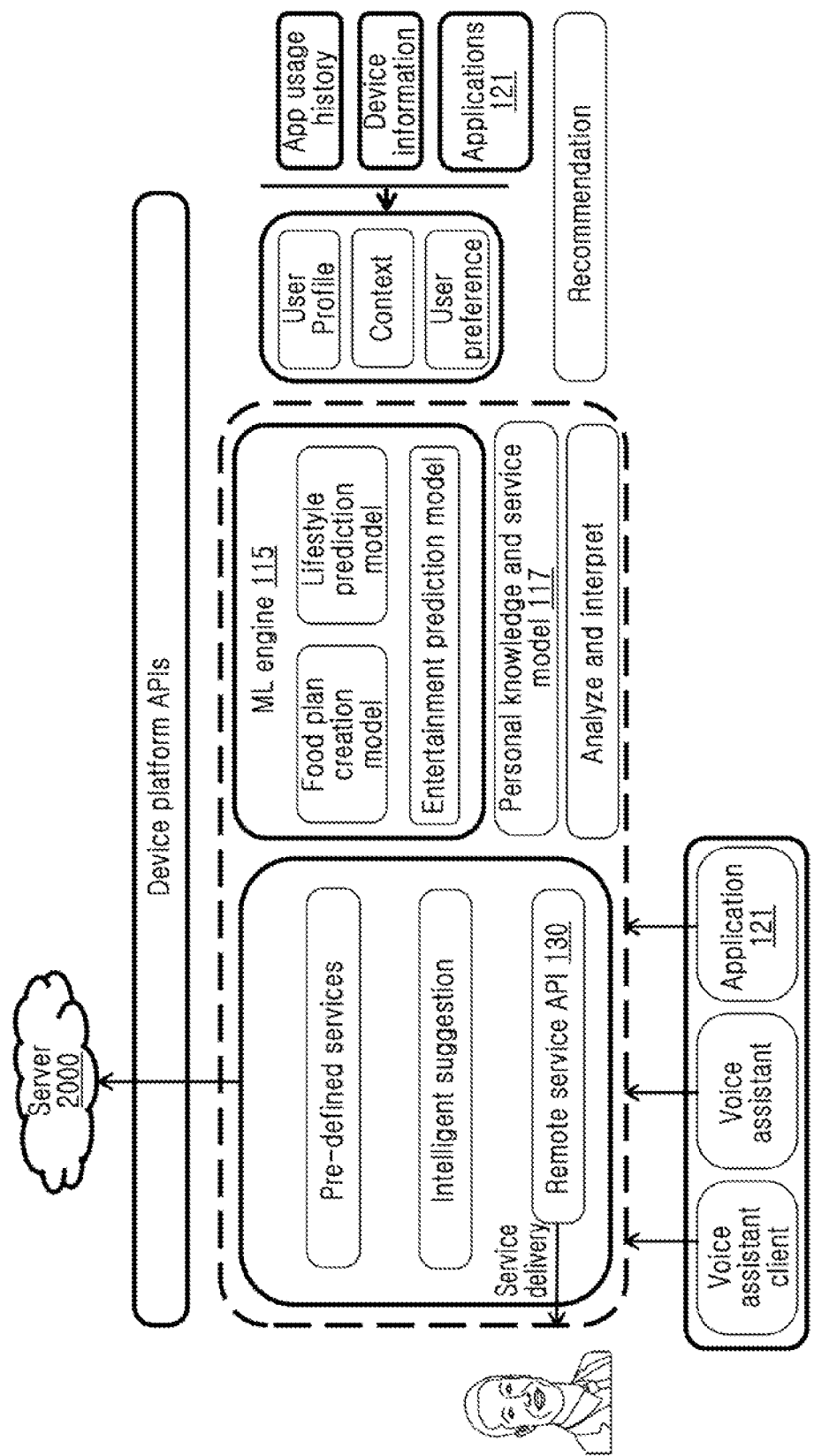
FIG. 2 is an architectural diagram of the first electronic device in the system, according to an embodiment of the disclosure.

FIG. 2 is an architectural diagram of the first electronic device 100 in the system 1000, according to an embodiment. The first electronic device 100 communicates to the server using a device platform APIs. The ML engine 115 monitors the user activities by analyzing the tasks performed by a voice assistant client (i.e. second electronic device 200), a voice assistant (i.e. first electronic device 100 or second electronic device 200), and the application 121 in the first electronic device 100 or second electronic device 200. The ML engine 115 may analyze the personal user data including one or more of the user profile, a context or the user preference obtained from at least one of: an application usage history, device information or the application 121 while performing the task by the voice assistant client, the voice assistant or the application 121.

The personal knowledge and service model 117 may generate a recommendation for generating the complete response or the partial response for the query based on the personal user data. The ML engine 115 may analyse the personal user data and may interpret a food plan model, a lifestyle prediction model, an entertainment prediction model. Further, the ML engine 115 may provide an intelligent suggestion to the response engine 114 based on the prediction model(s) and recommendation(s) from the personal knowledge and service model 117, for generating the complete response or the partial response. The response engine 114 may generate the complete response or the partial response based on the intelligent suggestion and the available pre-defined services at the first electronic device 100.

Figure 3A:
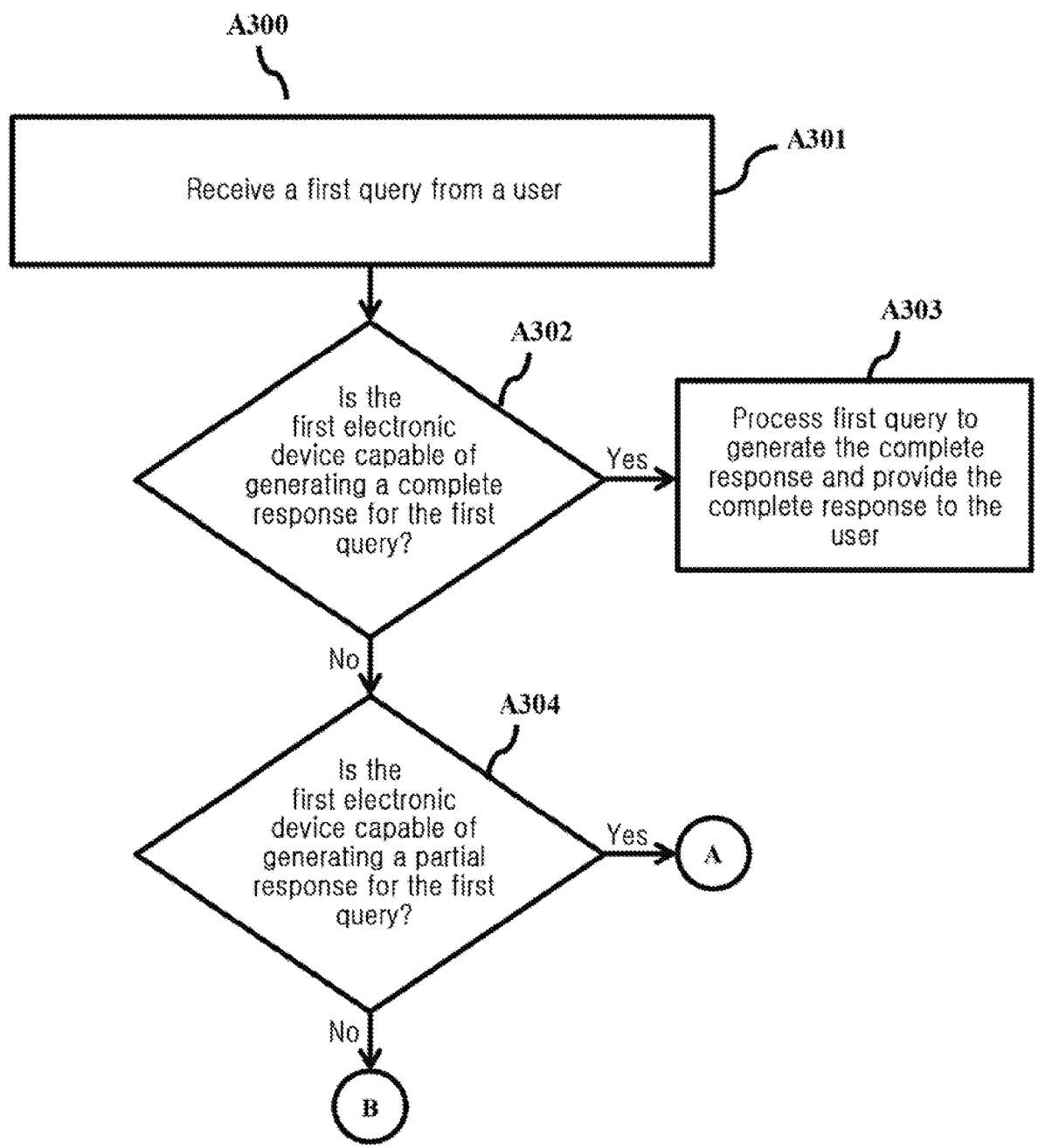
Figure 3B:
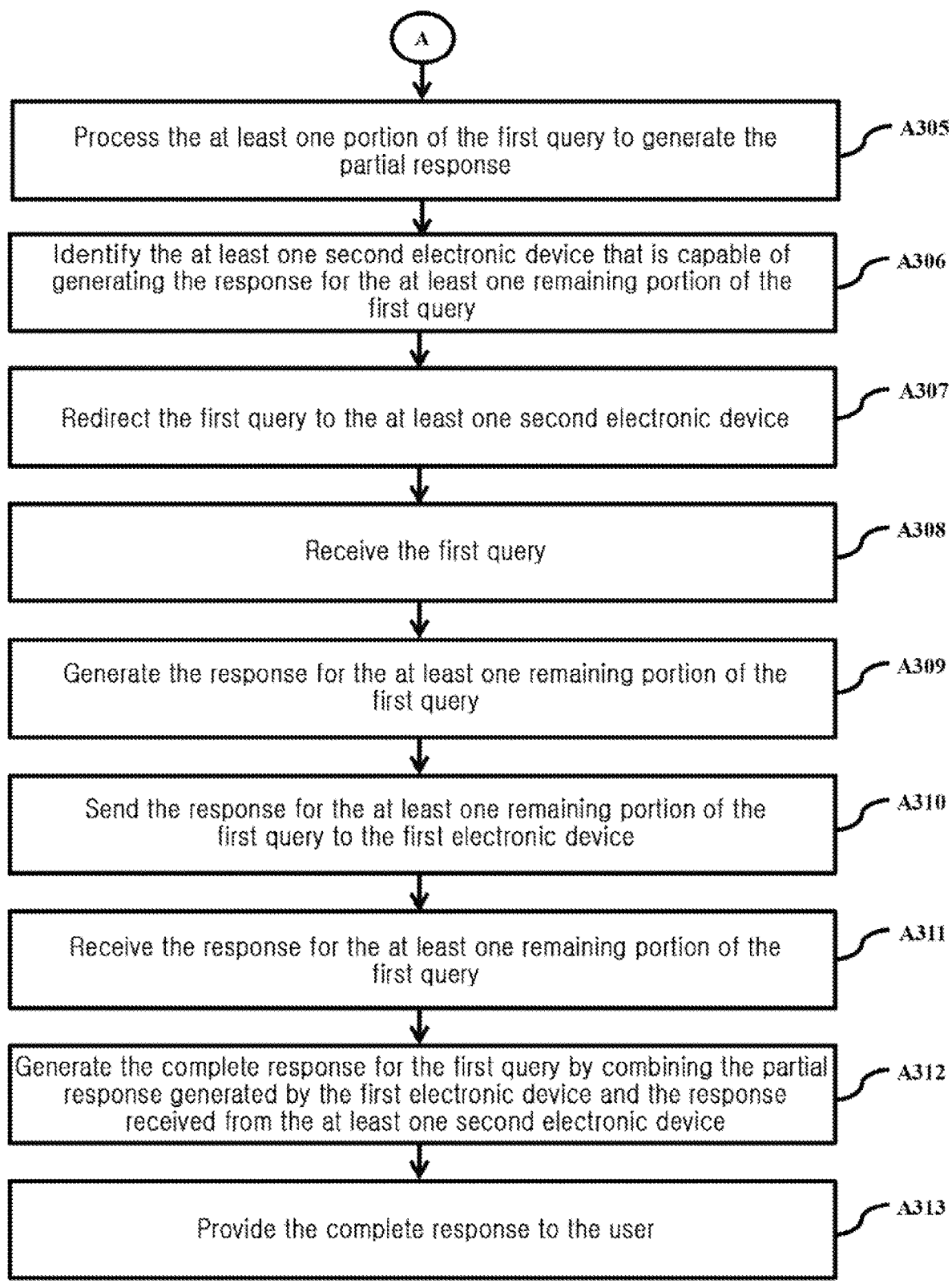

FIGS. 3A to 3C show a flow diagram A300 illustrating a method for providing the complete response for the first query of the user, according to an embodiment as disclosed herein. At A301, the method may include receiving the first query from the user. In an embodiment, the method allows the query engine 111 to receive the first query from the user. At A302, the method may include determining whether the first electronic device 100 is capable of generating complete response for the first query. In an embodiment, the method allows the service engine 112 to determine whether the first electronic device 100 is capable of generating the complete response for the first query. At A303, the method may include processing the first query to generate the complete response and provide the complete response to the user, upon determining that the first electronic device 100 is capable of generating the complete response for the first query. In an embodiment, the method allows the response engine 114 to process the first query to generate the complete response and provide the complete response to the user, upon determining that the first electronic device 100 is capable of generating the complete response for the first query.

At A304, the method may include determining whether the first electronic device 100 is capable of generating the partial response for the at least one portion of the first query, upon determining that the first electronic device 100 is not capable of generating the complete response for the first query. In an embodiment, the method allows the service engine 112 to determine whether the first electronic device 100 is capable of generating the partial response for the at least one portion of the first query, upon determining that the first electronic device 100 is not capable of generating the complete response for the first query. At A305, the method may include processing the at least one portion of the first query to generate the partial response, upon determining that the first electronic device 100 is capable of generating the partial response for the first query. In an embodiment, the method allows the response engine 114 to process the at least one portion of the first query to generate the partial response, upon determining that the first electronic device 100 is capable of generating the partial response for the first query.

At A306, the method may include determining the at least one second electronic device 200 that is capable of generating the response for the at least one remaining portion of the first query. In an embodiment, the method allows the device discovery engine 113 to determine the at least one second electronic device 200 that is capable of generating the response for the at least one remaining portion of the first query. At A307, the method may include sending (or redirecting) the first query to the at least one second electronic device 200. In an embodiment, the method allows the query engine 111 to redirect the first query to the at least one second electronic device 200. At A308, the method may include receiving the first query. For example, the second electronic device 200 may receive the first query from the first electronic device 100. In an embodiment, the method allows the query engine 211 to receive the first query. At A309, the method may include generating the response for the at least one remaining portion of the first query. In an embodiment, the method allows the response engine 212 to generate the response for the at least one remaining portion of the first query.

At A310, the method may include sending the response for the at least one remaining portion of the first query to the first electronic device 100. In an embodiment, the method allows the response engine 212 to send the response for the at least one remaining portion of the first query to the first electronic device 100. At A311, the method may include receiving the response for the at least one remaining portion of the first query. In an embodiment, the method allows the response engine 114 to receive the response for the at least one remaining portion of the first query. At A312, the method may include generating the complete response for the first query by combining the partial response generated by the first electronic device 100 and the response received from the at least one second electronic device 200. In an embodiment, the method allows the response engine 114 to generate the complete response for the first query by combining the partial response generated by the first electronic device 100 and the response received from the at least one second electronic device 200.

At A313, the method may include providing the complete response to the use. In an embodiment, the method allows the response engine 114 to provide the complete response to the user. At A314, the method may include determining that the first electronic device 100 is capable of generating the no response for the first query, upon determining that the first electronic device 100 is not capable of generating the partial response for the first query. In an embodiment, the method allows the service engine 112 to determine that the first electronic device 100 is capable of generating the no response for the first query, upon determining that the first electronic device 100 is not capable of generating the partial response for the first query. At A315, the method may include determining the at least one second electronic device 200 in the IoT network 1000 capable of generating the response (a partial response or a complete response) for the first query. In an embodiment, the method allows the device discovery engine 113 to determine the at least one second electronic device 200 in the IoT network 1000 capable of generating the response for the first query.

At A316, the method may include redirecting the first query and information available with the first electronic device 100 to the at least one second electronic device 200 capable of generating the complete response for the first query. In an embodiment, the method allows the query engine 111 to redirect the first query and information available with the first electronic device 100 to the at least one second electronic device 200 capable of generating the complete response for the first query. At A317, the method may include receiving the first query and the information available with the first electronic device 100. In an embodiment, the method allows the query engine 211 to receive the first query and the information available with the first electronic device 100. At A318, the method may include generating the complete response for the first query. In an embodiment, the method allows the response engine 212 to generate the complete response for the first query. At A319, the method may include providing the complete response to the user. In an embodiment, the method allows the response engine 212 to provide the complete response to the user.

The various actions, acts, blocks, steps, or the like in the flow diagram A300 may be performed in the order presented, in a different order or simultaneously. Further, in some embodiments, some of the actions, acts, blocks, steps, or the like may be omitted, added, modified, skipped, or the like without departing from the scope of the invention.

Figure 3D:
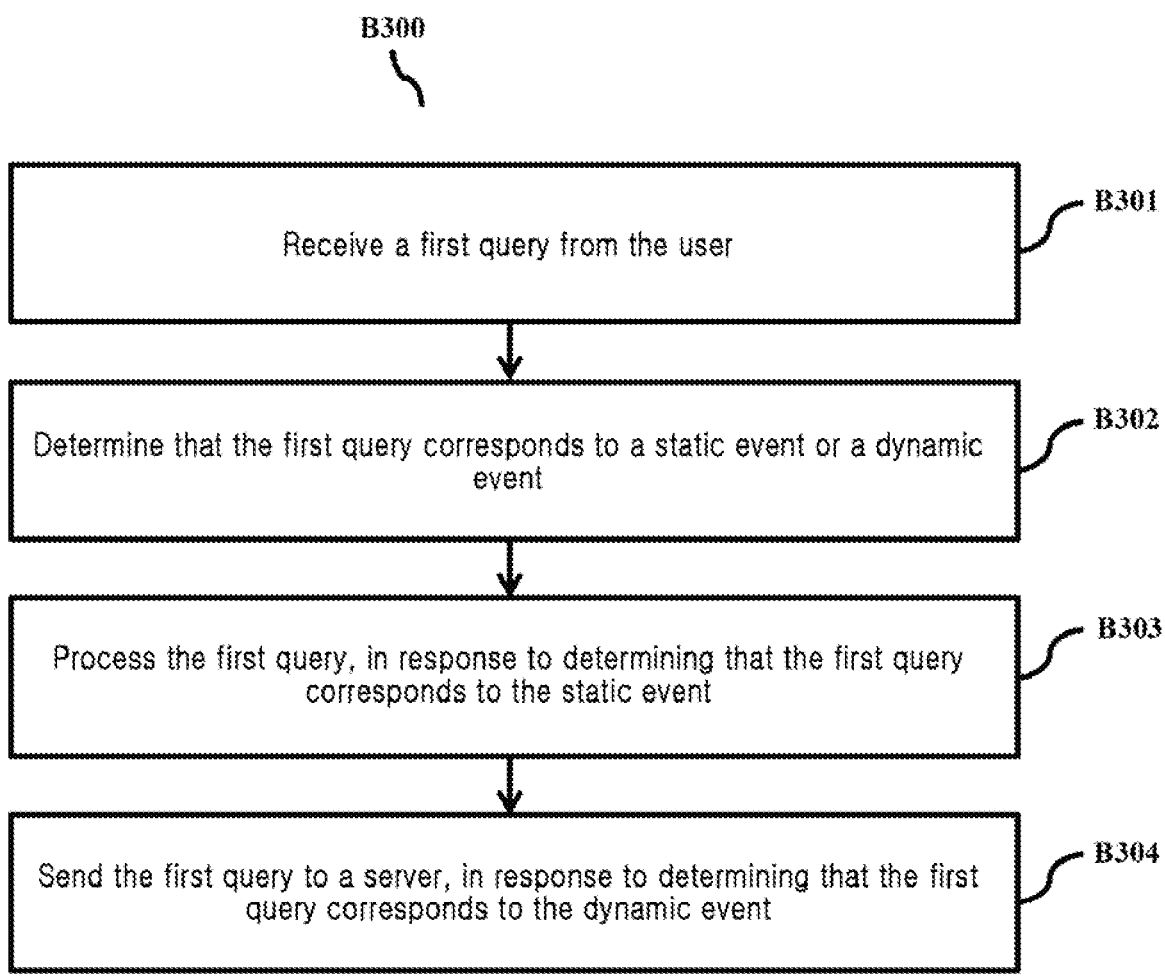
FIG. 3D is a flow diagram illustrating a method for managing queries of the user in the IoT network, according to an embodiment of the disclosure.

FIG. 3D is a flow diagram B300 illustrating a method for managing queries of the user in the IoT network 1000, according to an embodiment as disclosed herein. At B301, the method may include receiving the first query from the user. In an embodiment, the method allows the query engine 111 to receive the first query from the user. At B302, the method may include determining that the first query corresponds to the static event or the dynamic event. In an embodiment, the method allows the query engine 111 to determine that the first query corresponds to the static event or the dynamic event. At B303, the method may include processing the first query, in response to identifying that the first query corresponds to the static event. In an embodiment, the method allows the response engine 114 to process the first query, in response to identifying that the first query corresponds to the static event. At B304, the method may include sending the first query to the server 2000, in response to identifying that the first query corresponds to the dynamic event. In an embodiment, the method allows the query engine 111 to send the first query to the server 2000, in response to determining that the first query corresponds to the dynamic event.

The various actions, acts, blocks, steps, or the like in the flow diagram B300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
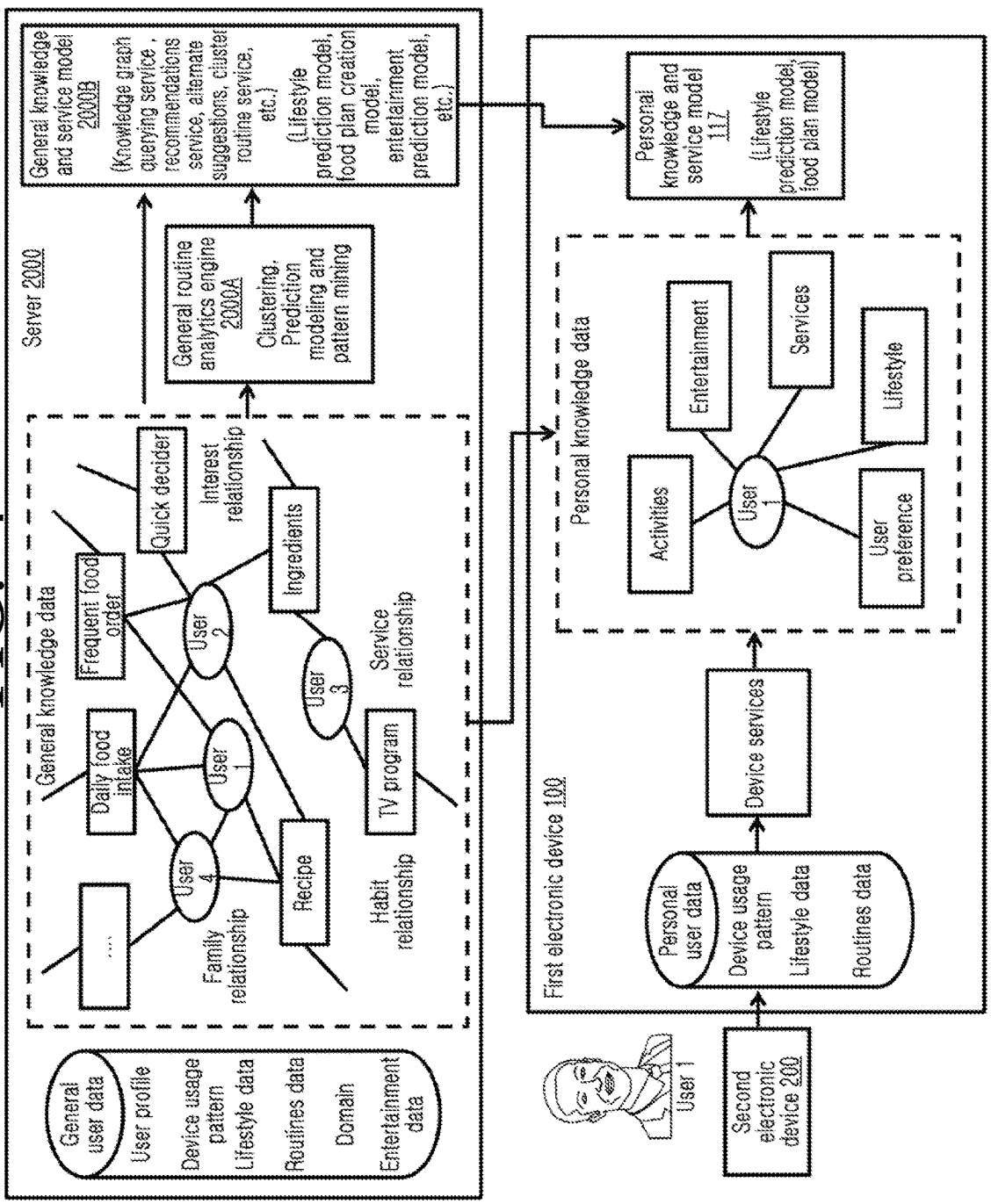
FIG. 4 is a flow diagram illustrating a method for generating a personal knowledge data and a personal service model using the first electronic device, according to an embodiment of the disclosure.

FIG. 4 is a flow diagram illustrating a method for generating the personal knowledge data and the personal knowledge service model 117 using the first electronic device 100, according to an embodiment as disclosed herein. In an embodiment, the server 2000 may include a general routine analytics engine 2000A and a general knowledge and service model 2000B. The server 2000 stores a general user data and a general knowledge data. The general user data is categorized as user profile, the device usage pattern, the lifestyle data, routines data, domain, and the entertainment data. The general knowledge data may indicate a relationship between each user with each items (e.g. recipe, ingredients, TV program, etc.) and events (e.g. daily food intake, frequent food order, etc.) associated with the user activities.

Examples for the relationship are a habit relationship, a service relationship, an interest relationship, a family relationship, etc. The general routine analytics engine 2000A performs clustering, generating prediction modeling and pattern mining on the general user data and the general knowledge data to crate the general knowledge and service model 2000B. The general knowledge and service model 2000B may include the knowledge graph query, the recommendations service, the alternate suggestions, the cluster routine service, the lifestyle prediction model, the food plan creation model, the entertainment prediction model, etc.

The first electronic device 100 monitors the user activities of user-1 performs using the services available at the second electronic device 200. Further, the first electronic device fetches the general knowledge data from the server 2000 for the user-1. Further, the first electronic device 100 generates the personal user data of the user-1 by generating the relationship of the user-1 with the items and events associated with the user activities of the user-1. Further, the first electronic device 100 fetches the services and models for user-1 from the general knowledge and service model 2000B. Further, the first electronic device 100 generates the personal knowledge and service model 117 for user-1 using the personal knowledge of the user-1 and the general knowledge and service model 2000B.

Figure 5:
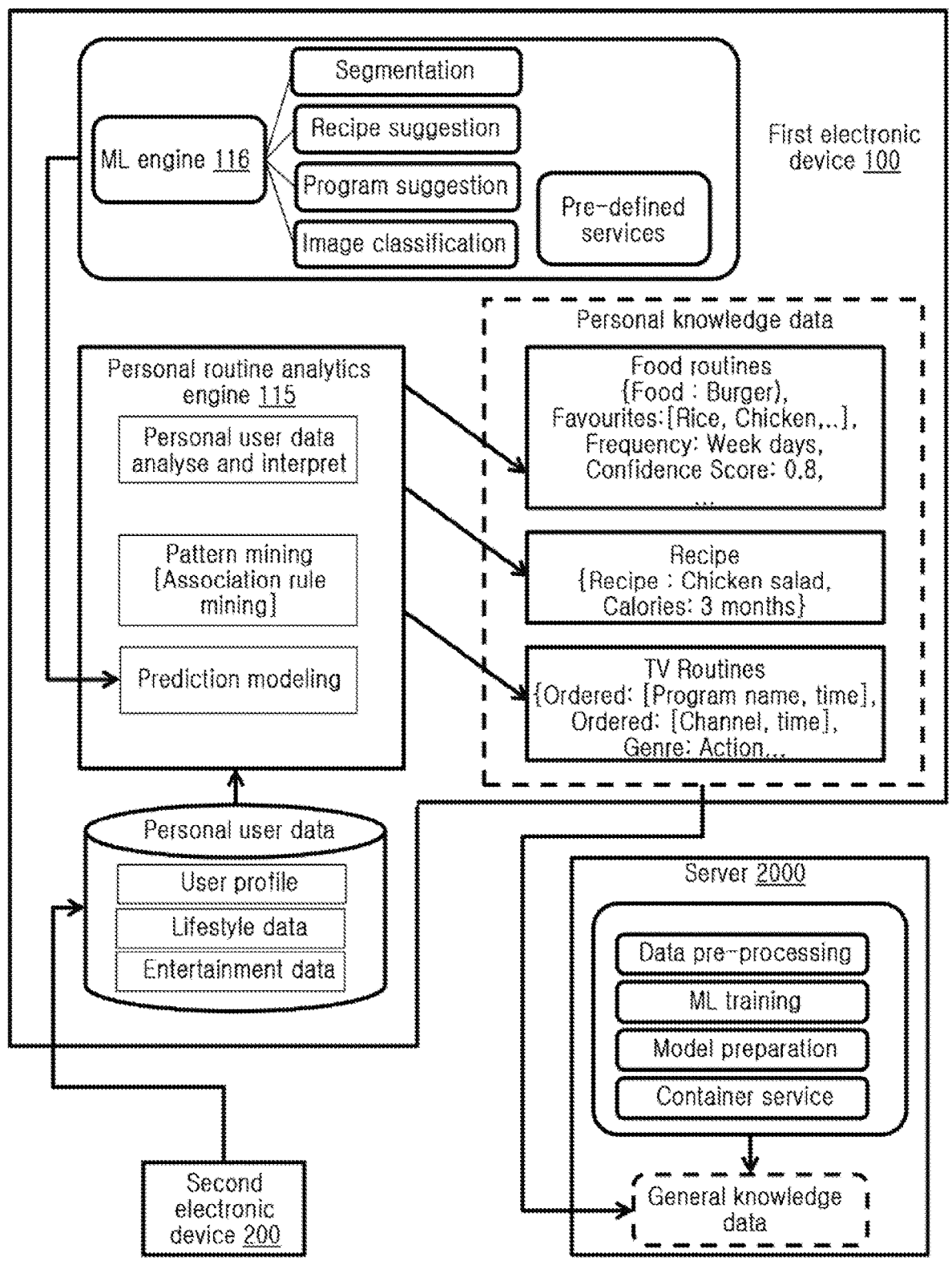
FIG. 5 is an example scenario illustrating a sequence of steps performed by a machine learning engine and a personal routine analytics engine for generating the personal knowledge data, according to an embodiment of the disclosure.

FIG. 5 is an example scenario illustrating a sequence of steps performed by the ML engine 116 and the personal routine analytics engine 115 for generating the personal knowledge data, according to an embodiment as disclosed herein. The first electronic device 100 monitors the user activities of performs at the second electronic device 200 by the user. The first electronic device 100 determines the personal user data of the user from the user activities perform at the second electronic device 200 by the user, where the personal user data may include the user profile, the lifestyle data and the entertainment data of the user. The personal routine analytics engine 115 performs analyzing and interpretation, pattern mining using the personal user data. The ML engine 116 has the capability to perform segmentation, recipe suggestion, program suggestion, image classification on the data obtains from the second electronic device 200.

The personal routine analytics engine 115 generates the personal knowledge data of the user by using the prediction models generated using the capabilities of the ML engine 116. The personal knowledge data of the user may include the food routine data, the recipe data and the TV routine data. The server 2000 updates the general knowledge data using the personal knowledge data of the user, where the server 2000 performs data pre-processing, ML training and model preparation and use container service for updating the general knowledge data.

In following example scenarios, the voice assistant operates as the first electronic device 100 and a smartphone, a fridge, a television (TV), a smart watch, a smart door lock and a robotic vacuum cleaner operate as the at least one second electronic device 200.

Figure 6:
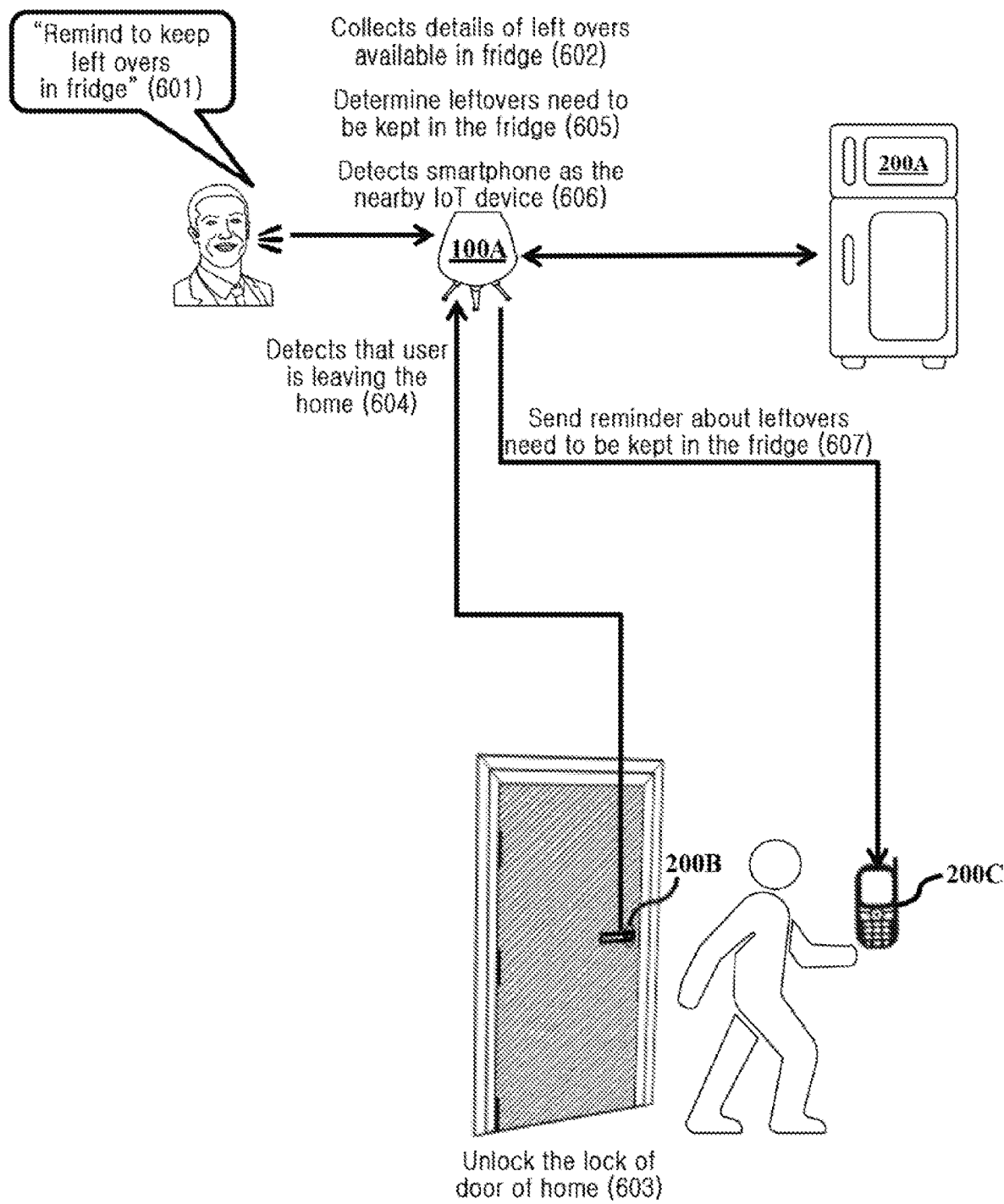
FIG. 6 illustrates an example scenario of providing a response for a voice query to the user by the voice assistant through a smartphone, in response to detecting that the user is leaving home, according to an embodiment of the disclosure.

FIG. 6 illustrates an example scenario of providing the response for the voice query to the user by a voice assistant 100A through a smartphone 200C, in response to detecting that the user is leaving home, according to an embodiment as disclosed herein. Consider, a fridge 200A, the smartphone 200C of the user and a smart door lock 200B are connected to the voice assistant 100A of the user. The voice assistant 100A will detect an availability of the user inside the home, in response to receiving the voice query form the user. The voice assistant 100A will determine that the user is leaving the home when the user unlocks the smart door lock 200B after detecting the availability of the user inside the home. The voice assistant 100A can access to the fridge 200A for getting details of the leftovers available in the fridge 200A.

Consider, the user provides (601) the voice query "Remind to keep leftovers in fridge" to the voice assistant 100A. The voice assistant 100A detects the availability of the user inside the home, in response to receiving the voice query. Further, the voice assistant 100A sets a reminder may include list of leftovers to be kept in fridge based on the received voice query. Further, the voice assistant 100A determines that the user does not specifies a time to remind about the leftovers. Further, the voice assistant 100A determines that the user should get remind about the leftovers to be kept in fridge 200A when the user is leaving the home based on the personal knowledge data of the user, in response to determining that the user does not specifies the time to remind about the leftovers. Further, the voice assistant 100A collects (602) details of leftovers available in fridge 200A.

Consider, the user unlocks (603) the smart door lock 200B to leave the home. The voice assistant 100A detects (604) that the user is leaving the home, in response to detecting that user unlocks the smart door lock 200B. Further, the voice assistant 100A determines that the user should get remind about the leftovers to be kept in fridge 200A, in response to detecting that the user is leaving the home. The voice assistant 100A identifies (605) the leftovers need to be kept in the fridge 200A based on the details of leftovers available in the fridge 200A. Further, the voice assistant 100A identifies (606) that the smartphone 200C is the nearest IoT device 200 to deliver the reminder. Further, the voice assistant 100A delivers the reminder to the user by sending the reminder to a smartphone 200C about the leftovers need to be kept in the fridge 200A (607).

Figure 7:
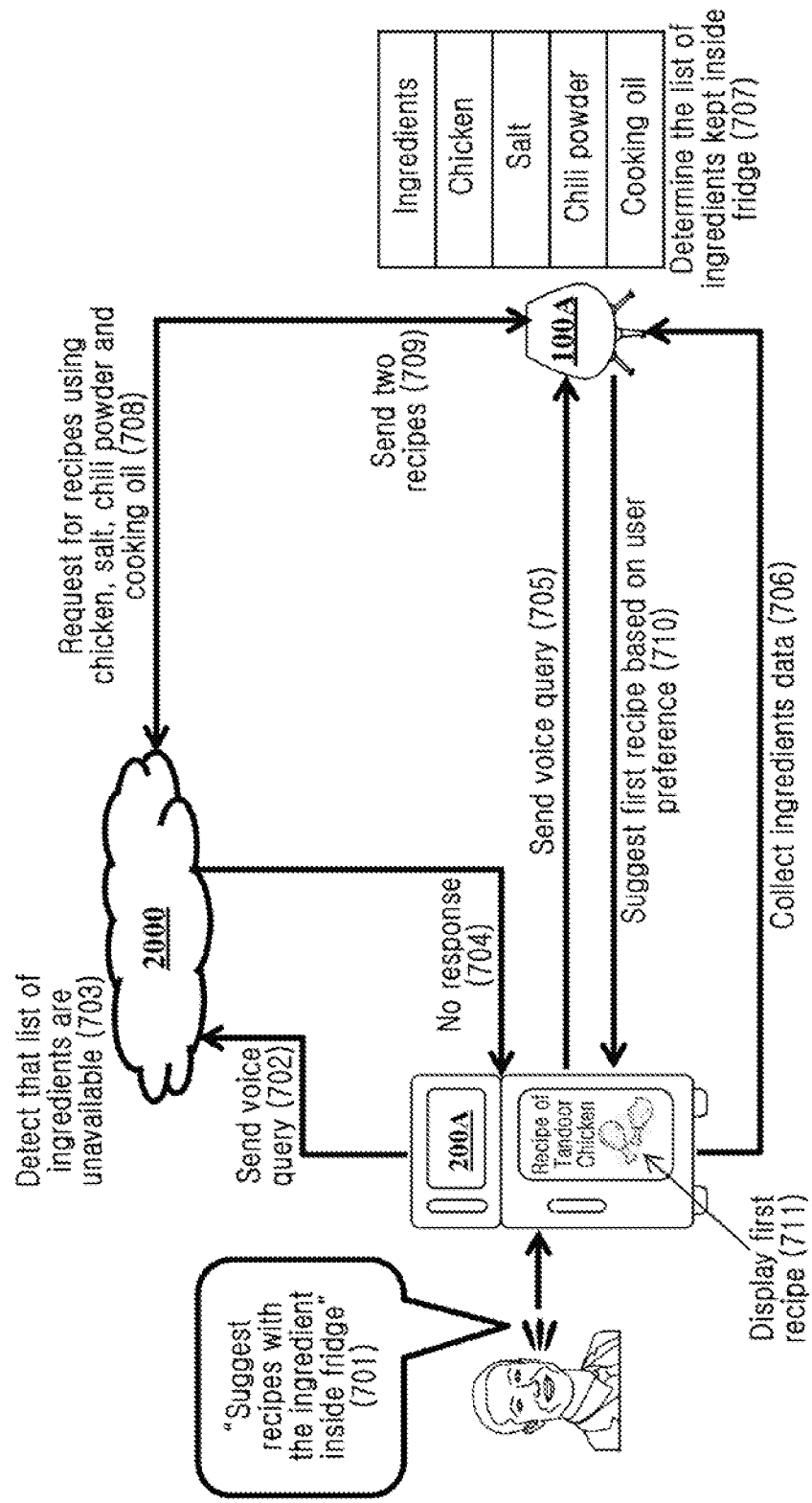
FIG. 7 illustrates an example scenario of sending (or redirecting) the voice query to the voice assistant by a fridge for providing the response to the user, in response to detecting that the fridge is not capable of providing the response using a server, according to an embodiment of the disclosure.

FIG. 7 illustrates an example scenario of sending (or redirecting) the voice query to the voice assistant 100A by the fridge 200A for providing the response to the user, in response to detecting that the fridge 200A is not capable to provide the response using the server 2000, according to an embodiment as disclosed herein. Consider, the fridge 200A is connected to the voice assistant 100A of the user. The voice assistant 100A can access to the details of the ingredients available in the fridge 200A. The fridge 200A and the voice assistant 100A are connected to the server 2000. Consider, the server 2000 is capable to provide recipes using the ingredients when the server 2000 receives a list of ingredients. The ingredients kept inside the fridge 200A are chicken, salt, chili powder and cooking oil. The voice assistant 100A stores the user preference to the personal knowledge data, where the user preferred to eat oil less foods.

Consider, the user provides (701) the voice query "Suggest recipes with the ingredient inside fridge" to the fridge 200A. The fridge 200A sends (702) the voice query to the server 2000 to process the voice query and generate the response. The server 2000 does not generate the response upon detecting (703) that the ingredients list is unavailable in the voice query to suggest the recipes. Further, the fridge 200A receives (704) no response notification from the server 2000. The fridge 200A redirects (705) the voice query to the voice assistant, in response to detecting that the fridge 200A is not capable to provide the response to the user. The voice assistant 100A determines that ingredients data is required to get the recipes from the server 2000, in response to receiving the voice query. Further, the voice assistant 100A collects (706) the ingredients data from the fridge 200A, where the ingredients data may include the list of ingredients kept inside the fridge 200A. Further, the voice assistant 100A determines (707) the list of ingredients kept inside the fridge 200A.

The voice assistant 100A request (708) to the server 2000 for providing recipes using at least chicken, salt, chili powder and cooking oil. The server 2000 provides (709) two recipes available in a database of the server 2000 to the voice assistant 100A, where the recipes include at least chicken, salt, chili powder and cooking oil. Consider, the first recipe is about preparation of tandoor chicken, where oil is not used in the first recipe. Consider, the second recipe is about preparation of chicken dry fry, where the cooking oil is used in the second recipe. The voice assistant 100A suggests (710) the first recipe to the user based on the user preference in the personal knowledge data by sending the first recipe to the fridge 200A. Further, the fridge 200A displays (711) the first recipe to the user on a display screen of the fridge 200A.

Figure 8:
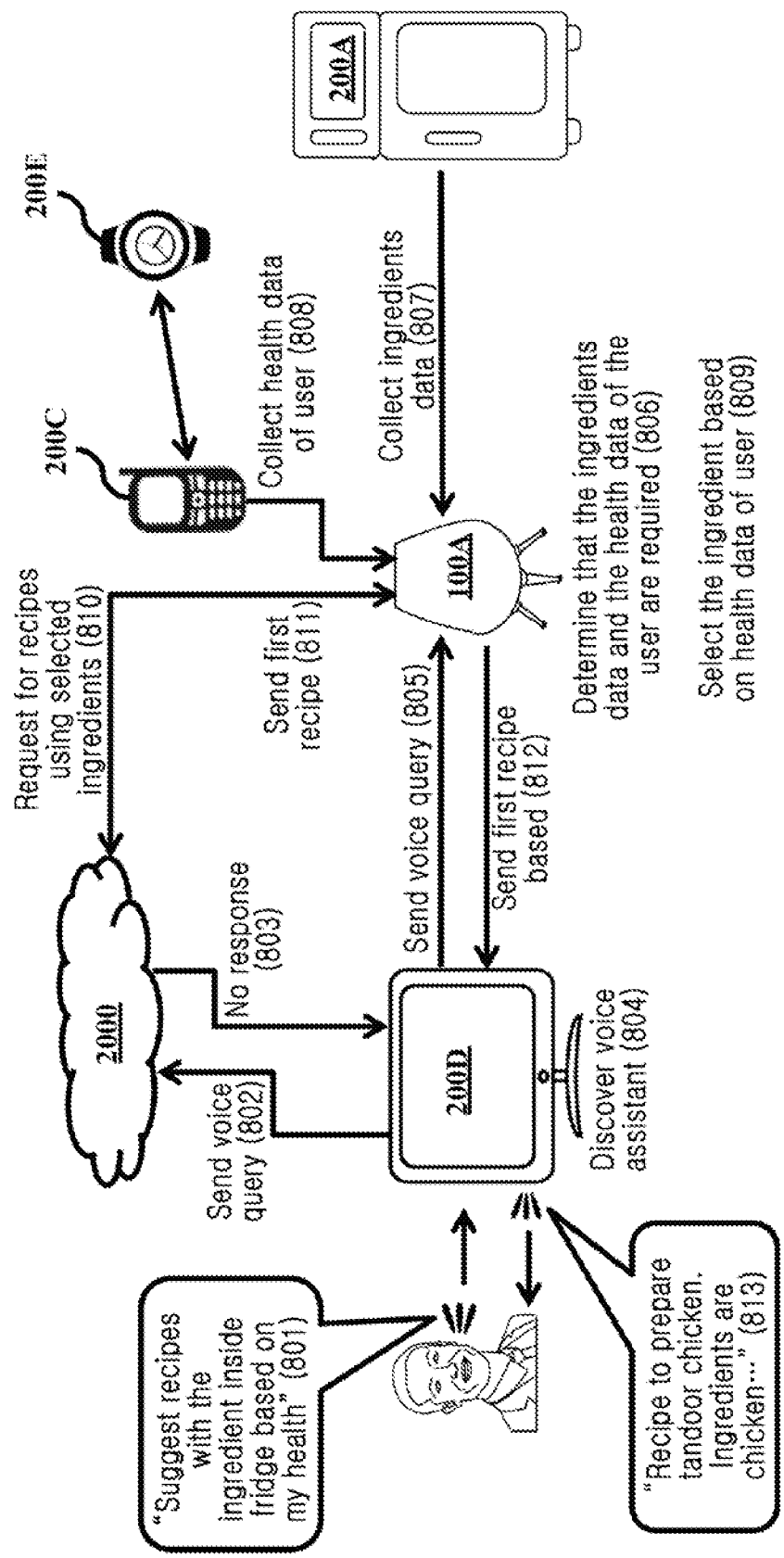
FIG. 8 illustrates an example scenario of sending (or redirecting) the voice query to the voice assistant by a television for providing the response to the user, in response to detecting that the fridge is not capable of providing the response, according to an embodiment of the disclosure.

FIG. 8 illustrates an example scenario of transmitting (or redirecting) the voice query to the voice assistant 100A by the TV 200D for providing the response to the user, in response to detecting that the fridge 200A is not capable of providing the response, according to an embodiment as disclosed herein. Consider, the smartphone 200C of the user, the fridge 200A and the TV 200D are connected to the voice assistant 100A of the user. The voice assistant 100A can access to the details of the ingredients available in the fridge 200A. The voice assistant 100A can access to information stored in the smartphone 200C. The TV 200D and the voice assistant 100A are connected to the server 2000. Consider, the server 2000 is capable to provide recipes using the ingredients when the server 2000 receives the list of ingredients. The ingredients kept inside the fridge 200A are chicken, salt, chili powder and cooking oil.

Consider, the user wears a smart watch 200E which is connected to the smartphone 200C. The smart watch 200E provides a health data of the user to the smartphone 200C. Further, the smartphone 200C stores the health data of the user. Consider, as per the health data of the user, having oily food is injurious to the health of the user.

Consider, the user provides (801) the voice query "Suggest recipes with the ingredient inside fridge based on my health" to the TV 200D. The TV 200D sends (802) the voice query to the server 2000 to process the voice query and generate the response. The server 2000 detects that the voice query is not related to services providing by the TV 200D. The server 2000 does not generate the response for the voice query upon detecting that the voice query is not related to services providing by the TV 200D. Further, the TV 200D receives (803) the no response notification from the server 2000. The TV 200D discovers (804) the voice assistant 100A to generate response for the voice query based on a specification of the voice assistant 100A, where the specification of the voice assistant 100A may include a hardware specification of the voice assistant 100A and a capability details of the voice assistant 100A. Further, the TV 200D redirects (805) the voice query to the voice assistant.

The voice assistant 100A determines (806) that the ingredients data and the health data of the user needs to be collected based on the voice query. Further, the voice assistant 100A collects (807) the ingredients data from the fridge 200A, where the ingredients data may include the list of ingredients kept inside the fridge 200A. The voice assistant 100A collects (808) the health data of the user stored in the smartphone 200C by accessing the smartphone 200C. Further, the voice assistant 100A determines that having the oily food is injurious to the health of the user based on the health data of the user. Further, the voice assistant 100A selects (809) the ingredients other than cooking oil from the list of ingredients based on the health data of the user. The voice assistant 100A request (810) to the server 2000 for providing recipes using at least chicken, salt and chili powder. The server 2000 provides (811) the first recipes available in the database of the server 2000 to the voice assistant 100A, where the first recipe is about preparation of tandoor chicken, where the cooking oil is not needed in the preparation of tandoor chicken. The voice assistant 100A sends (812) the first recipe to the TV 200D. The TV 200D provides the first recipe to the user in the form of an audio response through speakers of the TV 200D upon receiving the first recipe (813).

Figure 9:
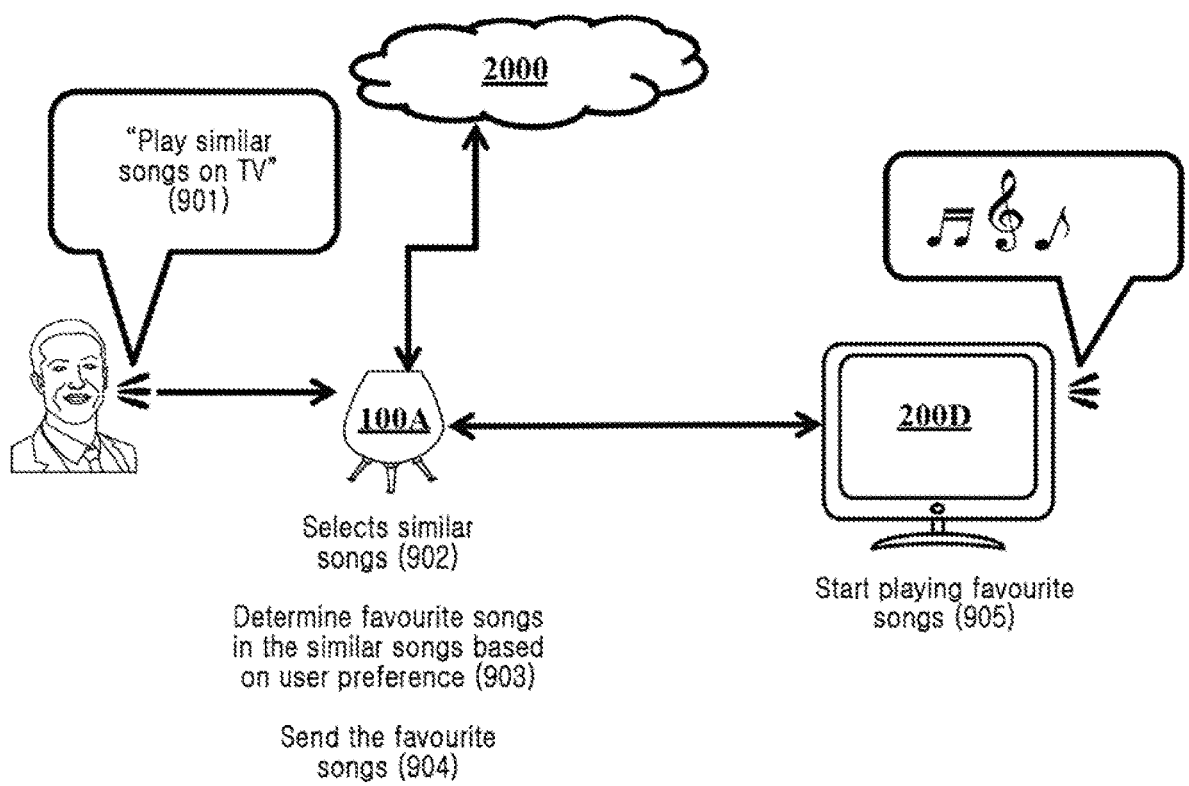
FIG. 9 illustrates an example scenario of identifying favorite songs for the user based on a user preference by the voice assistant for playing favorite songs on the television, according to an embodiment of the disclosure.

FIG. 9 illustrates an example scenario of determining favorite songs for the user based on the user preference by the voice assistant 100A for playing the favorite songs on the TV 200D, according to an embodiment as disclosed herein. Consider, the TV 200D is connected to the voice assistant 100A of the user. The voice assistant 100A is connected to the server 2000. The voice assistant 100A can control the TV 200D. The user preferred to listen songs of an artist "John", where the user preference in listening songs are stored as the personal knowledge data in the voice assistant 100A.

Consider, the voice assistant 100A is playing a song. The user provides (901) the voice query "Play similar songs on TV" to the voice assistant 100A. The voice assistant 100A determines a genre of the song. Further, the voice assistant 100A selects (902) the similar songs from a set of songs available in the database of the server 2000 based on the genre of the song currently playing at the voice assistant 100A. Further, the voice assistant 100A determines (903) the favorite songs from the similar songs based on the user preference. The voice assistant 100A selects the songs of the artist "John" from the similar songs as the favorite songs of the user. Further, the voice assistant 100A (904) sends the favorite songs to the TV 200D to play the songs and configure the TV 200D to play the favorite songs. Further, the TV 200D starts (905) to play the favorite songs. Specifically, the TV 200D may output audio data corresponding to a favorite song through a speaker or output image data corresponding to a favorite song through a display.

Figure 10:
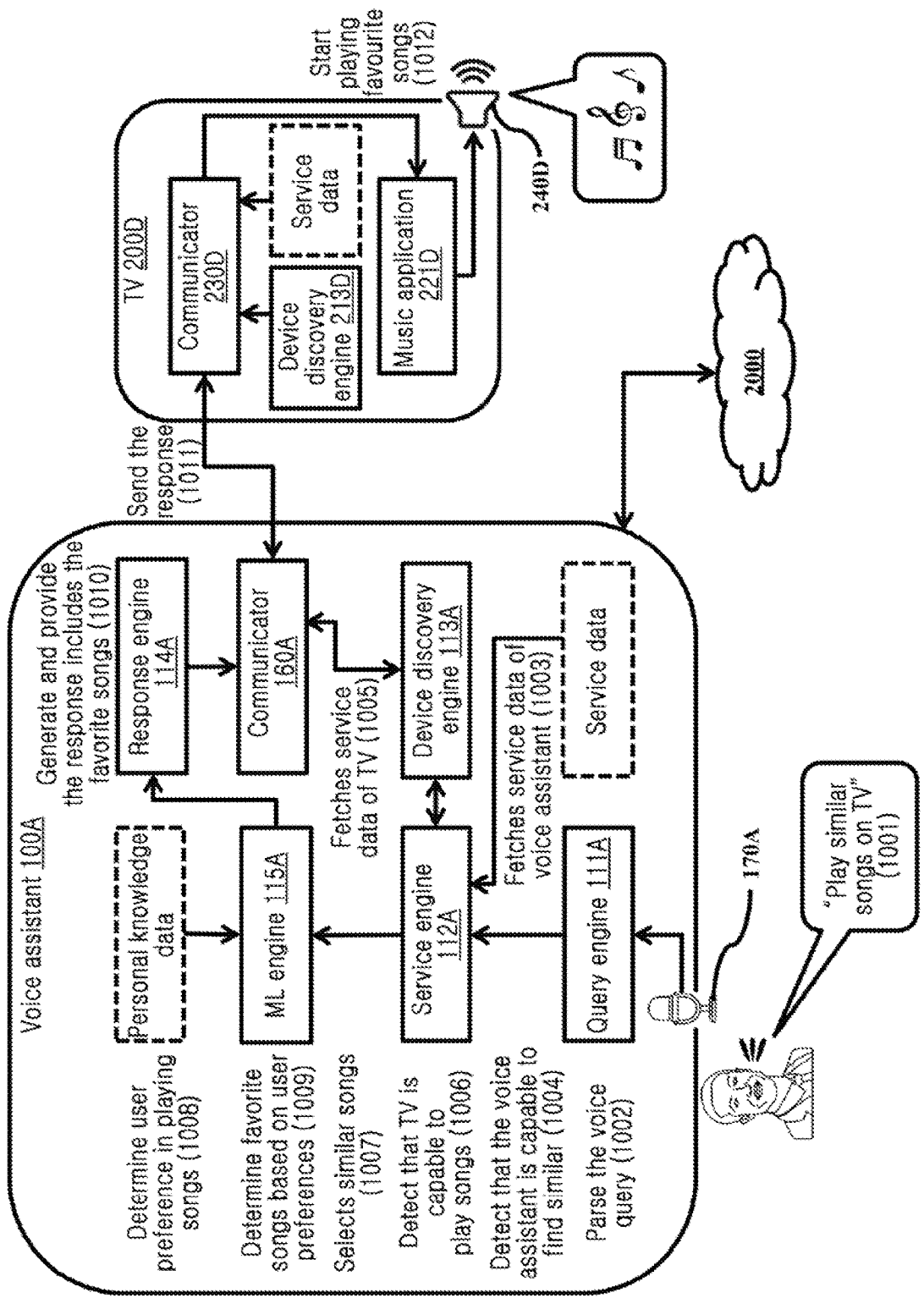
FIG. 10 flow diagram illustrating a sequence of steps performed by each hardware component of the voice assistant for determining the favorite songs and playing the favorite songs on the television, according to an embodiment of the disclosure.

FIG. 10 flow diagram illustrating a sequence of steps performed by each hardware component of the voice assistant 100A for determining the favorite songs and playing the favorite songs on the TV 200D, according to an embodiment as disclosed herein. Consider, the TV 200D is connected to the voice assistant 100A of the user. The voice assistant 100A is connected to the server 2000. The voice assistant 100A can control the TV 200D. The user preferred to listen songs of an artist "John", where the user preference in listening songs are stored as the personal knowledge data in the voice assistant 100A.

The hardware components of the voice assistant 100A may include a query engine 111A, a device discovery engine 113A, a service engine 112A, a ML engine 115A, a response engine 114A, a memory 120A (not shown), a microphone 170A, a speaker 180A and a communicator 160A, where the service data of the voice assistant 100A and the personal knowledge data of the user is stored in the memory 120A. The query engine 111A, the device discovery engine 113A, the service engine 112A, the ML engine 115A, the response engine 114A, the memory 120A and the communicator 160A of the voice assistant 100A operates same as the query engine 111, the device discovery engine 113, the service engine 112, the ML engine 115, the response engine 114, the memory 120 and the communicator 160 of the first electronic device 100 respectively.

The hardware components of the TV 200D may include a communicator 230D, a music application 221D, a memory 220D (not shown), a device discovery engine 213D and a speaker 240D, where the service data of the TV 200D is stored in the memory 220D. The communicator 230D, the music application 221D, the memory 220D and the device discovery engine 213D of the TV 200D operates same as the communicator 230, the application 221, the memory 220 and the device discovery engine 213 of the second electronic device 200 respectively. The music application 221D allows the TV 200D play songs send by the voice assistant 100A. The capability of the TV 200D to play songs send by the voice assistant 100A is added in the service data of the TV 200D.

Consider, the voice assistant 100A is capable to determine similar songs based on genre of the song requested by the user. The capability of the voice assistant 100A to determine the similar songs is added in the service data of voice assistant 100A.

Consider, the voice assistant 100A is playing the song through the speaker 180A. The user provides (1001) the voice query "Play similar songs on TV" to the voice assistant 100A. The microphone 170A receives the voice query of the user. Further, the microphone 170A sends the voice query to the query engine 111A. The query engine 111A parses (1002) the voice query and retrieves the intent of the user.

The service engine 112A fetches (1003) the service data of voice assistant 100A for determining the capability of the voice assistant 100A. The service engine 112A detects (1004) that the voice assistant 100A is capable to determine the similar songs based on the service data of the voice assistant 100A. The service engine 112A requests to the device discovery engine 113A to fetch the service data of the TV 200D for determining the capability of the TV 200D. The device discovery engine 113A determines the availability of the TV 200D by communicating to the device discovery engine 213D of the TV 200D. Further, the device discovery engine 113A requests (1005) to the TV 200D for obtaining the service data of the TV 200D, in response to identifying the availability of the TV 200D. The device discovery engine 113A provides the service data of the TV 200D, in response to receiving the service data of the TV 200D from the TV 200D. The service engine 112A detects (1006) that the TV 200D is capable to play the songs shared by the voice assistant 100A based on the service data of the TV 200D.

Further, the service engine 112A selects (1007) the similar songs from the set of songs available in the database of the server 2000 based on the genre of the song currently playing at the voice assistant 100A. Further, the ML engine 115A determines (1008) the user preference in playing songs from the personal knowledge data. The ML engine 115A determines (1009) the favorite songs from the similar songs based on the user preference. The voice assistant 100A selects the songs of the artist "John" from the similar songs as the favorite songs of the user. Further, the ML engine 115A provides an information of the favorite songs to the response engine 114A. The response engine 114A generates the response may include the favorite songs. Further, the response engine 114A send the response to the TV 200D through the communicator 160A and the communicator 230D. The music application 221D starts (1012) playing the favorite songs, in response to receiving the favorite songs from the voice assistant 100A, where the speaker 240D generates an audio corresponding to playing the favorite songs.

Figure 11:
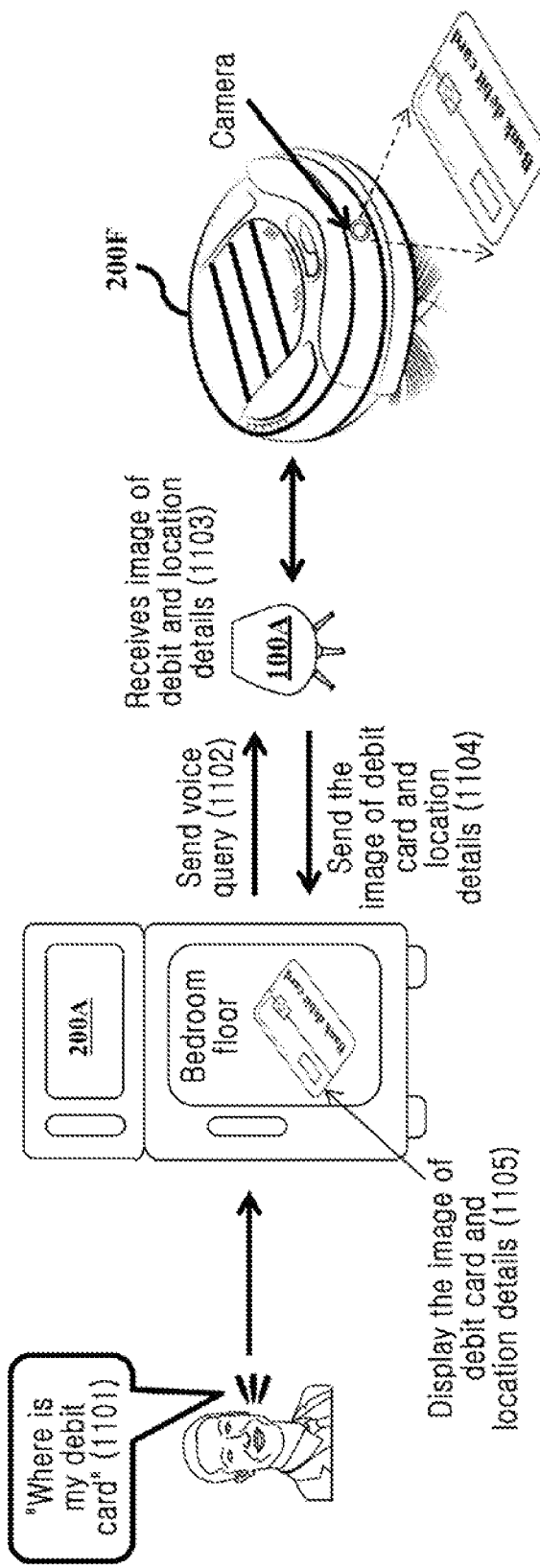
FIG. 11 illustrates an example scenario of generating the response for the voice query by the voice assistant based on a communication between the voice assistant and a robotic vacuum cleaner, according to an embodiment of the disclosure.

FIG. 11 illustrates an example scenario of generating the response for the voice query by the voice assistant 100A based on a communication between the voice assistant 100A and a robotic vacuum cleaner 200F, according to an embodiment as disclosed herein. Consider, the fridge 200A and the robotic vacuum cleaner 200F are connected to the voice assistant 100A of the user. The voice assistant 100A can access to the robotic vacuum cleaner 200F to fetch recoded images and location details. The robotic vacuum cleaner 200F may include a camera to capture images of surroundings visible in front of the robotic vacuum cleaner 200F and a GPS sensor to determine the location details where the robotic vacuum cleaner 200F is currently cleaning.

Consider, a debit card of the user has fallen on floor of a bedroom. The robotic vacuum cleaner 200F has captured the image of the debit card while cleaning the floor of the bedroom. Further, the robotic vacuum cleaner 200F has recorded the image of the debit card and the location of the robotic vacuum cleaner 200F while capturing the image of the debit card.

Figure 12:
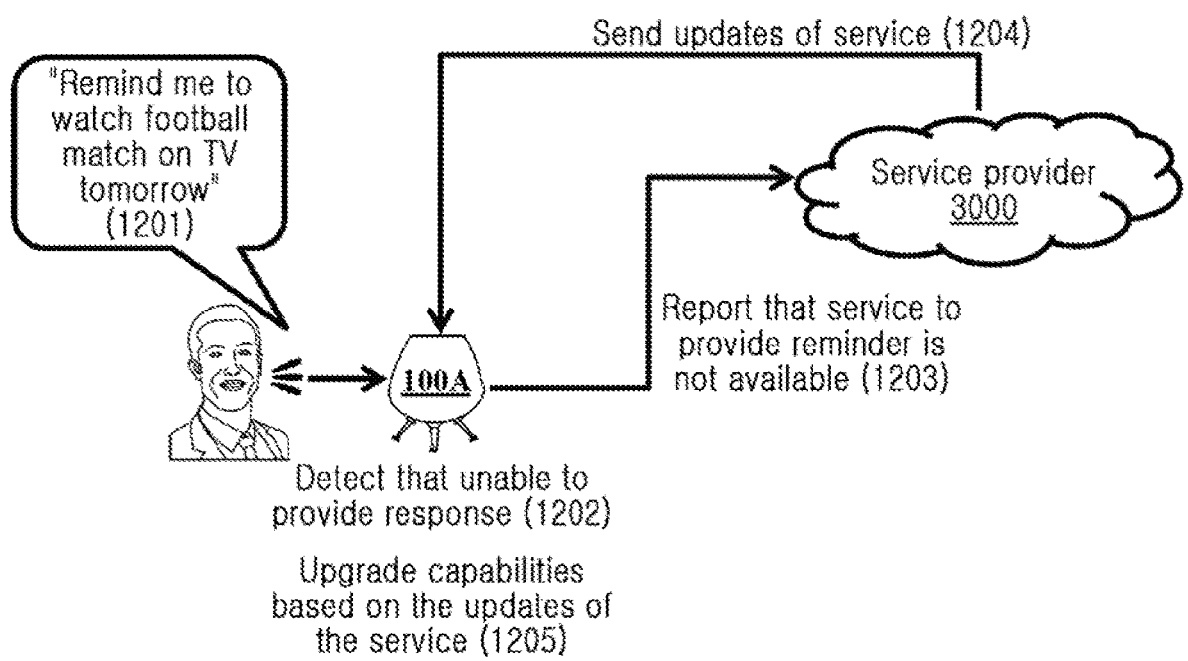
FIG. 12 illustrates an example scenario of upgrading the capabilities of the first electronic device, in response to receiving updates of service by the first electronic device from a service provider, according to an embodiment of the disclosure.

Consider, the user provides (1101) the voice query "Where is my debit card" to the fridge 200A. The fridge 200A detects that the fridge 200A is unable to generate a response for the voice query. Further, the fridge 200A redirects (or sends) (1102) the voice query to the voice assistant 100A. The voice assistant 100A communicates with the at least one second electronic device 200 in the IoT network 1000 for fetching (or receiving) details of the debit card, where the robotic vacuum cleaner 200F is one of the second electronic device 200 in the IoT network 1000. The second electronic device 200 (corresponding to a robot vacuum cleaner 200F in FIG. 11) provides the image of the debit card and the location details of the robotic vacuum cleaner 200F to the voice assistant 100A while capturing the image of the debit card. The voice assistant 100A receives an image of the debit card and location details of the robot vacuum cleaner 200F (1103). Further, the voice assistant 100A generates the response for the voice query by sending (1104) the image of the debit card and the location details to the fridge 200A. The fridge 200A provides the response to the user by displaying (1105) the image of the debit card and the location details. The refrigerator 200A that received the user's voice query may identify that a response to the user's voice query cannot be provided. The refrigerator 200A may provide the user's voice query to the voice assistant 100A in order to provide the response to the user's voice query, so that an external device (the robot vacuum cleaner 200F in FIG. 12) may be used instead of the refrigerator 200A. The voice assistant 100A may identify an external device capable of providing a response to the user's voice query. When it is identified that the voice assistant 100A is a query for finding a specific object (or a predetermined object) in the user's voice query, it may identify an external device including a camera and capable of moving. When the movable external device including a camera is identified, the voice assistant 100 may control the external device to find a specific object included in the user's voice query. Specifically, the voice assistant 100A may receive an image from the camera included in the external device and analyze the received image to identify the specific object included in the user's voice query. When the specific object is identified in the image acquired from the external device, the voice assistant 100A may transmit location information of the external device at the moment when the specific object is identified to the refrigerator 200A. In addition, the refrigerator 200A may display location information of the external device at the moment when the specific object is identified through a display as image data, or output as audio data through a speaker. Meanwhile, according to another embodiment, the voice assistant 100A may transmit the image in which the specific object is identified together with location information of the external device to the refrigerator 200A. In addition, the refrigerator 200A may display the image in which the specific object is identified and location information of the external device through the display. Meanwhile, the refrigerator 200A may display a map together in providing the location information of the external device at the moment when the specific object is identified. For example, the refrigerator 200A may provide an entire map corresponding to an indoor space and location information of the external device at the moment when the specific object is identified. Since the user can view the entire map of the indoor space and location information together, the location of the specific object may be easily identified. FIG. 12 illustrates an example scenario of upgrading the capabilities of the first electronic device 100, in response to receiving the updates of the service by the first electronic device 100 from the service provider 3000, according to an embodiment as disclosed herein. In the example scenario, the voice assistant 100A is the first electronic device 100. The voice assistant 100A is connected to the service provider 3000. Consider, the voice assistant 100A does not have the capability to set the reminder and remind the user, in response to receiving the voice query to set the reminder.

Consider, the user provides (1201) the voice query "Remind me to watch football match on TV tomorrow" to the voice assistant 100A. The voice assistant 100A detects (1203) that the voice assistant 100A does not have the capability to provide the reminder to the user. The voice assistant 100A reports (1203) to the service provider 3000 that the voice assistant 100A does not have the service to set the reminder. The service provider 3000 sends (1204) the updates of the service to the voice assistant 100A for enabling the service to set the reminder, in response to receiving the report. The voice assistant 100A upgrades (1205) the capabilities of the voice assistant 100A to enable the service for setting the reminder to send the reminder to the user. For example, updates of service may be installation data to provide a service for setting reminders.

Figure 13:
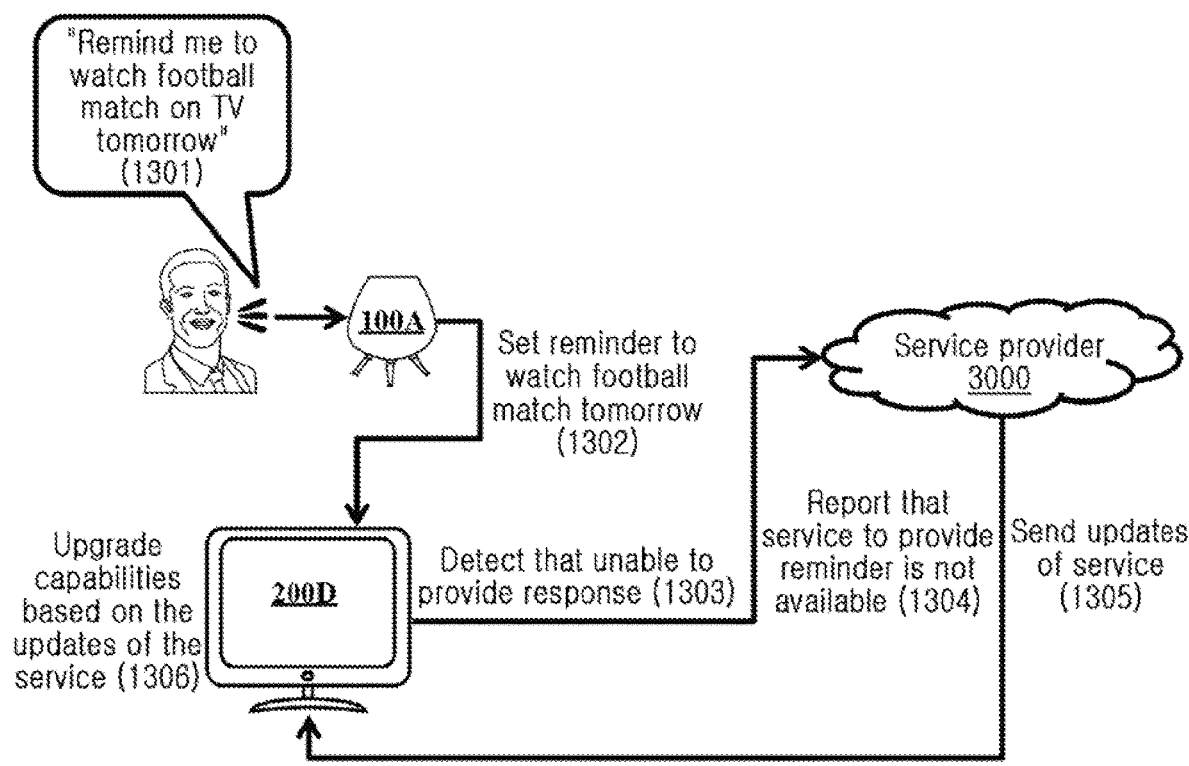
FIG. 13 illustrates an example scenario of upgrading the capabilities of the second electronic device, in response to receiving the updates of the service by the second electronic device from the service provider, according to an embodiment of the disclosure.

FIG. 13 illustrates an example scenario of upgrading the capabilities (or capability of providing service) of the second electronic device 200, based on the second electronic device 200 receiving the updates of the service from the service provider 3000, according to an embodiment. In the example scenario, the voice assistant 100A is the first electronic device 100 and the TV 200D is the second electronic device 200. The TV 200D is connected to the voice assistant 100A and the service provider 3000. Consider, the voice assistant 100A is capable to set the reminder, in response to receiving the voice query to set the reminder. The TV 200D may identify that the capability (or capability to provide service) to remind the user is not included, in response to receiving an instruction to set the reminder from the voice assistant 100A.

Consider, the user provides (1301) the voice query "Remind me to watch football match on TV tomorrow" to the voice assistant 100A. The voice assistant 100A generates the response for voice query by sending (1302) the instruction to the TV 200D to provide the reminder to the user for watching the football match on the TV 200D tomorrow. Further, the TV 200D detects (1303) that the TV 200D does not have the capability (or capability to provide service) to provide the reminder to the user. The TV 200D reports (1304) to the service provider 3000 that the TV 200D does not have the service to provide the reminder. The service provider 3000 sends (1305) the updates of the service to the TV 200D for enabling the TV 200D to provide the reminder service, in response to receiving the report. The TV 200D receives the updates from the service provider 3000 and upgrades (1306) the capabilities of the TV 200D to enable the service for providing the reminder to the user. The updates may include installation data related to a service providing capability that the TV 200D does not have based on the report sent to the service provider 3000.

Figure 14:
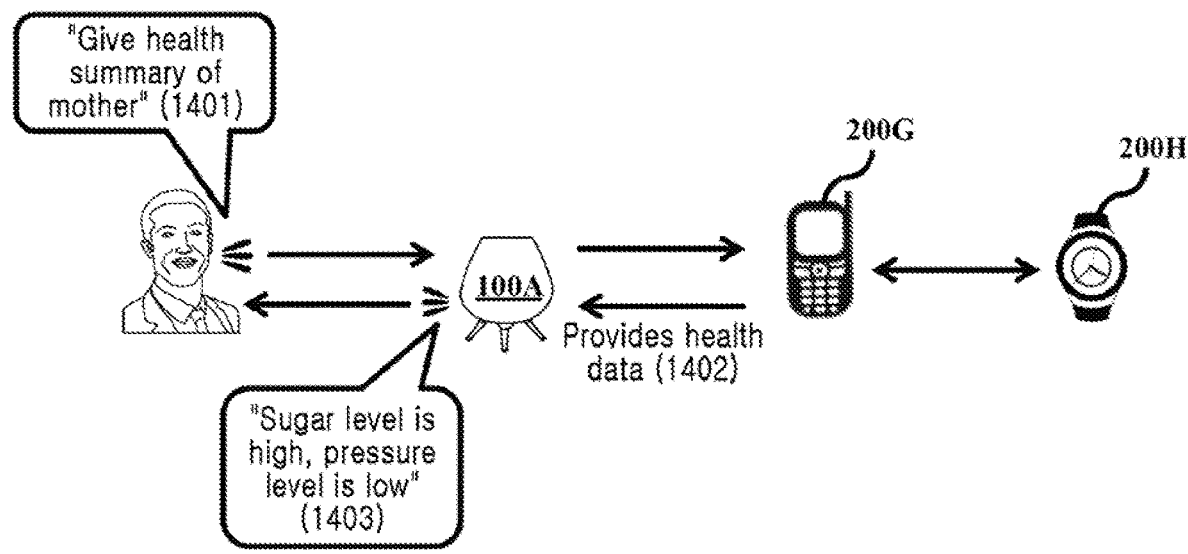
FIG. 14 illustrates an example scenario of checking health data of mother of the user by the voice assistant, in response to receiving the voice query from the user, according to an embodiment of the disclosure.

FIG. 14 illustrates an example scenario of checking the health data of mother of the user by the voice assistant 100A, in response to receiving the voice query from the user, according to an embodiment as disclosed herein. In the example scenario, the mother wears the smart watch 200H which is connected to the smartphone 200H of the mother. The smart watch 200G provides the health data of the mother to the smartphone 200G. Further, the smartphone 200G stores the health data of the mother. The smartphone 200G of the mother is connected to the voice assistant 100A of the user. The voice assistant 100A can access to the smartphone 200G to fetch the health data of the mother.

Consider, the user provides (1401) the voice query "Give health summary of mother" to the voice assistant 100A. The voice assistant 100A communicates with the smartphone 200G to collect (1402) the health data of the mother. The smartphone 200G may communicate with the smart watch 200H that stores the mother's health data. In addition, the smartphone 200G may transmit a control command requesting the mother's health data to the smart watch 200H, and receive the mother's health data from the smart watch 200H in response to the control command. Further, the voice assistant 100A provides (1403) the health data of the mother in the form of the audio response to the user, in response to collecting the health data of the mother from the smartphone 200G. For example, the voice assistant 100A may output audio data of "the blood sugar is high and the blood pressure is low" through a speaker included in the voice assistant 100A.

Figure 15:
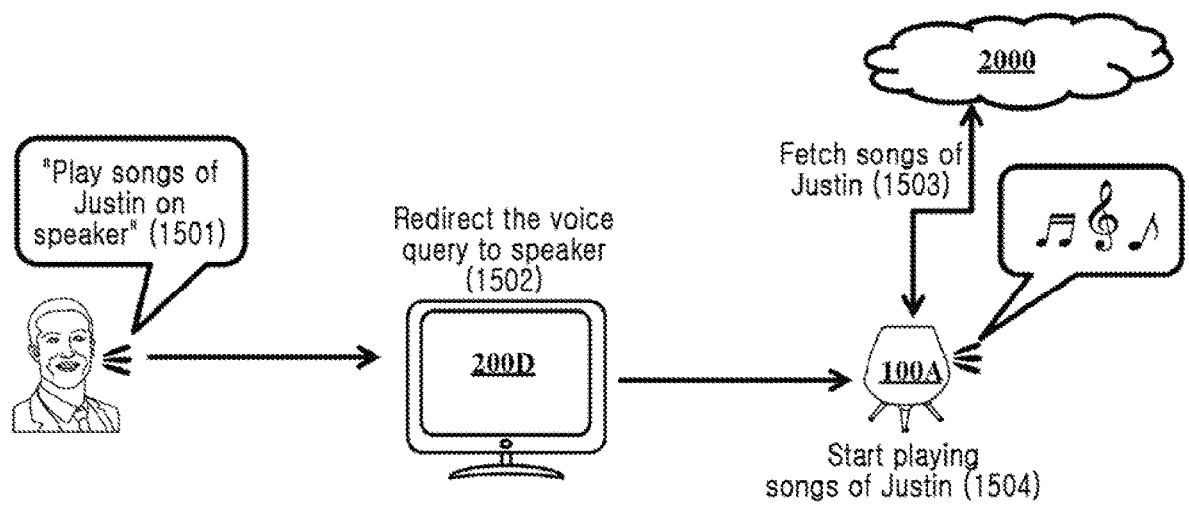
FIG. 15 illustrates an example scenario of sending (or redirecting) the voice query to the voice assistant by the television for providing the response to the user based on the voice query, according to an embodiment of the disclosure.

FIG. 15 illustrates an example scenario of transmitting (or redirecting) the voice query to the voice assistant 100A by the TV 200D for providing the response to the user based on the voice query, according to an embodiment as disclosed herein. In the example scenario, the voice assistant 100A of the user is connected to the TV 200D and the server 2000. The voice assistant 100A is capable to play songs of an artist, in response to receiving the voice query to play songs of the artist.

Consider, the user provides (1501) the voice query "Play songs of Justin on speaker" to the TV 200D. The TV 200D redirects (1502) the voce query to the voice assistant 100A, in response to detecting that the TV 200D is unable to generate the response for the voice query. The voice assistant 100A detects "Justin" as the artist by parsing the voice query upon receiving the voice query. Specifically, the voice assistant 100A may parse the voice query received from the TV 200D to identify information related to a song included in the voice query. For example, the song-related information may include at least one of artist information, song information, and album information. When information related to the song is identified from the voice query, the voice assistant 100A may transmit information related to the identified song to the server 2000. In addition, the server 2000 may identify at least one music audio data based on information related to the song transmitted from the voice assistant 100A, and transmit the identified music audio data to the voice assistant 100A. In addition, the voice assistant 100A may receive from the server 2000. The voice assistant 100A fetches (or receives) at least one music audio data whose artist is Justin (1503). Further, the voice assistant 100A starts (1504) to play the songs of Justin.

Figure 16:
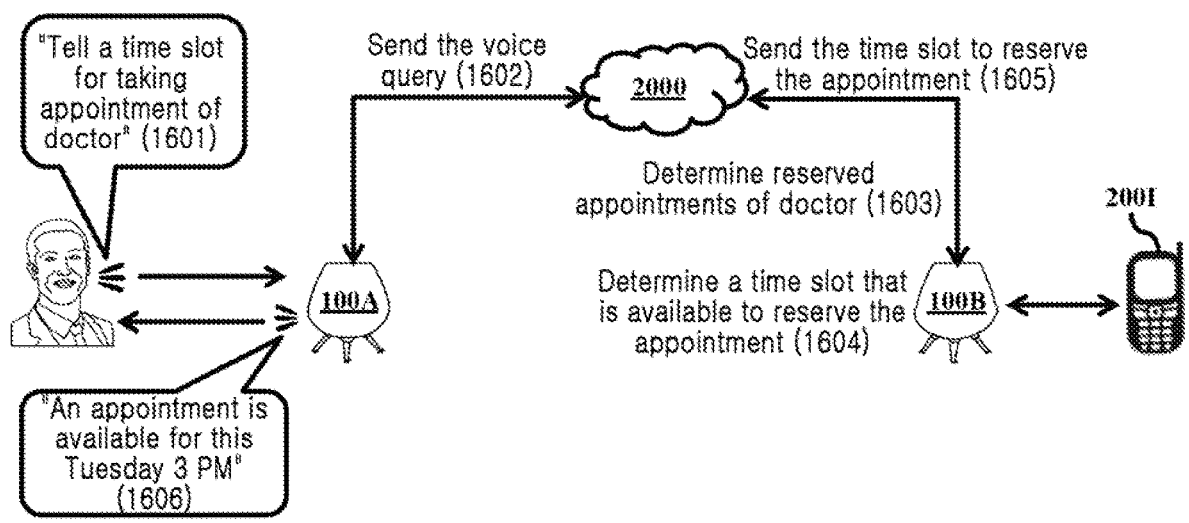
FIG. 16 illustrates an example scenario of identifying a time slot for making (or booking) an appointment of a doctor by the voice assistant based on reserved appointments of the doctor, according to an embodiment of the disclosure.

FIG. 16 illustrates an example scenario of identifying a time slot for reserving appointment of a doctor by the voice assistant 100A based on reserved appointments of the doctor, according to an embodiment as disclosed herein. In the example scenario, the voice assistant 100A of the user is connected to the voice assistant 100B of the doctor through the server 2000. The user's voice assistant 100A is capable to communicate with the voice assistant 100B to send the voice query to the doctor's voice assistant 100B and receive the responses from the voice assistant 100B. The voice assistant 100B is connected to a smartphone 200I of the doctor, where the reserved appointments of the doctor may be stored at the smartphone 200I. The voice assistant 100B can communicate with the smartphone 200I to get the reserved appointments of the doctor. Specifically, the voice assistant 100B may transmit a control command requesting information on the reserved appointment to the doctor's smartphone 200I. The doctor's smartphone 200I may transmit information on the reserved appointment to the voice assistant 100B in response to the control command received from the voice assistant 100B. The voice assistant 100B may identify an unreserved empty time slot based on information on the reserved appointment received from the doctor's smartphone 200I. Further, voice assistant 100B has a capability of identifying available timeslots for reserving an appointment with the doctor based on the reserved appointments.

Consider, the user provides (1601) the voice query "Tell a time slot for taking appointment of doctor" to the voice assistant 100A. The voice assistant 100A redirects (or transmit) (1602) the voice query to the voice assistant 100B, in response to detecting that the voice assistant 100A is unable to generate the response for the voice query. The voice assistant 100B determines (1603) the reserved appointments of the doctor by contacting the doctor's smartphone 200I upon receiving the voice query. Further, the voice assistant 100B determines an available time slot (or a time slot that has not already been reserved) to reserve an appointment with the doctor based on the doctor's reserved appointments (1604). Further, the voice assistant 100B generates (1605) the response by sending the time slot available to reserve the appointment of the doctor to the voice assistant 100A. The voice assistant 100A provides (1606) the time slot available to reserve the appointment of the doctor in the form of the audio response upon receiving the response from the voice assistant 100B.

Figure 17:
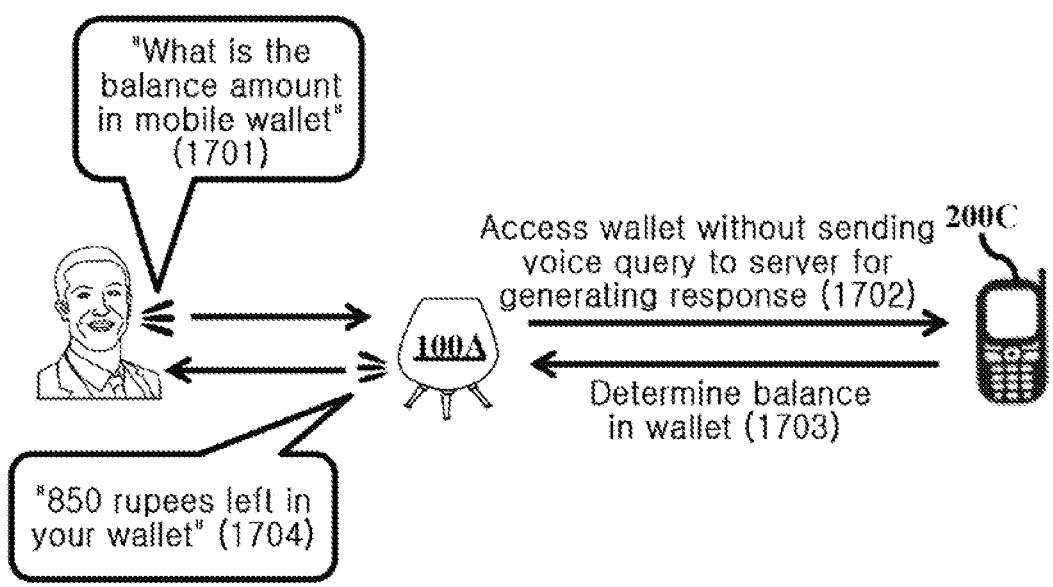
FIG. 17 illustrates an example scenario of determining a balance in a wallet of the smartphone by the voice assistant without sending the voice query to the server for determining the balance in the wallet, according to an embodiment of the disclosure.

FIG. 17 illustrates an example scenario of determining a balance in a wallet of the smartphone 200C by the voice assistant 100A without sending the voice query to the server 2000 for determining the balance in the wallet, according to an embodiment as disclosed herein. In the example scenario, the voice assistant 100A of the user is connected to the smartphone 200C of the user. The voice assistant 100A is capable to communicate with the smartphone 200C to access the smartphone 200C.

Consider, the user provides (1701) the voice query "What is the balance amount in mobile wallet" to the voice assistant 100A. The voice assistant 100A detects that the processing of the voice query required security. Further, the voice assistant 200A process the voice query without communicating to the server 2000 for maintaining security. Specifically, the voice assistant 100A accesses (1702) the smartphone 200C to determine the balance in a mobile wallet. For example, the voice assistant 100A transmits a control command for acquiring information on the balance of the mobile wallet to the smartphone 200C. The smartphone 200C transmits information on the balance of the mobile wallet stored in the smartphone 200C to the voice assistant 100A in response to the control command received from the voice assistant 100A. Additionally, the voice assistant 100A receives information on the balance of the mobile wallet from the smartphone 200C, and identifies the wallet balance (1703). Further, the voice assistant 100B generates the response including the balance in the wallet and provides (1704) the response as the audio response to the user through a speaker included in the voice assistant 100A.

Figure 18:
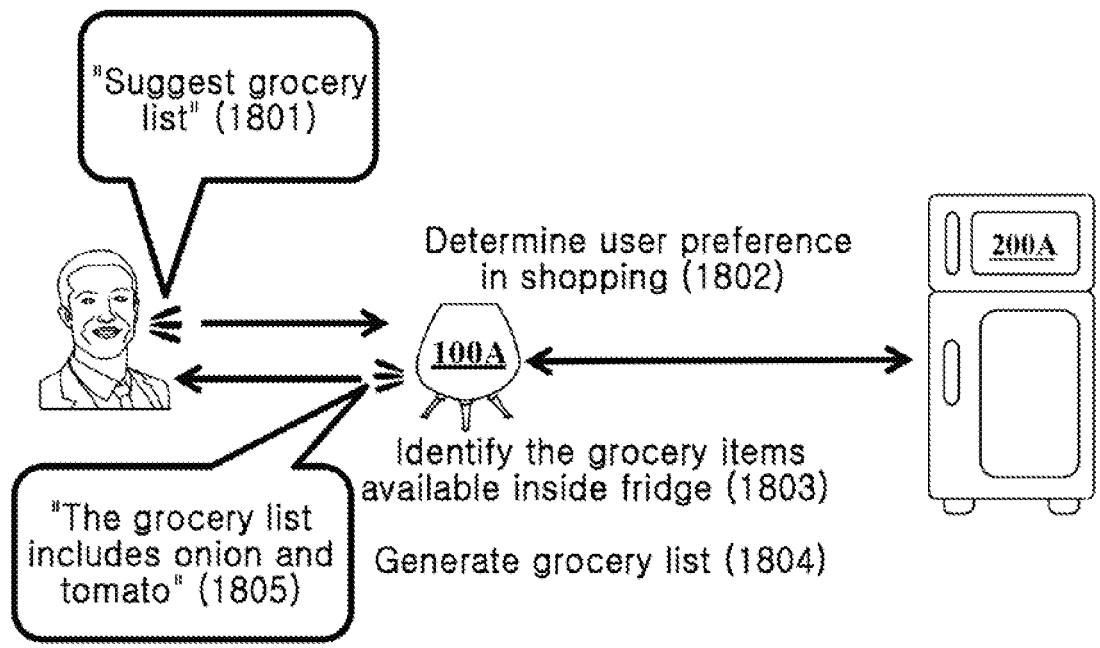
FIG. 18 illustrates an example scenario of suggesting a grocery list to the user for the voice query by the voice assistant, in response to determining a user preference in shopping, according to an embodiment of the disclosure.

FIG. 18 illustrates an example scenario of suggesting a grocery list to the user for the voice query by the voice assistant 100A, in response to determining the user preference in shopping, according to an embodiment as disclosed herein. Consider, the fridge 200A is connected to the voice assistant 100A of the user. The voice assistant 100A can access to details of the grocery items available inside the fridge 200A. The grocery items available inside the fridge 200A are apple and milk. The voice assistant 100A stores the user preference in shopping grocery items based on a history of the grocery items available inside the fridge 200A after each shopping. The user preferred to buy onion, tomato, apple and milk during shopping.

Consider, the user provides (1801) the voice query "Suggest grocery list" to the voice assistant 100A. The voice assistant 100A receives the voice query and starts processing the voice query to generate the response. The voice assistant 100A determines (1802) the user preference in shopping grocery list. Specifically, the voice assistant 100A may transmit a control command for requesting information on available food items to the refrigerator 200A. The refrigerator 200A may transmit information on available food items to the voice assistant 100A in response to the control command received from the voice assistant 100A. Further, the voice assistant 100A collects and identify (1803) the grocery items available inside the fridge 200A from the fridge 200A. Further, the voice assistant 100A identifies the list of available groceries based on user preferences (or grocery items that the user prefers) and grocery items currently available in refrigerator 200A, when shopping for grocery items (1804). Specifically, the voice assistant 100A may identify a grocery list by identifying a grocery item that is not currently available in the refrigerator 200A among a plurality of grocery items preferred by the user. In addition, the voice assistant 100A generates a response based on a grocery list including grocery items that correspond to the plurality of groceries that the user prefers but are not currently available in the refrigerator 200A. Further, voice assistant 100A provides the response including the grocery list to the user in the form of an audio response (1805). For example, it is assumed that food items that the user prefers are onions, tomatoes, apples, and milk, and food items that are currently available in the refrigerator 200A are apples and milk. The voice assistant 100A may consequently generate a grocery list including onions and tomatoes and generate a response based on the generated grocery list. In addition, the voice assistant 100A may output the generated response as audio data through a speaker included in the voice assistant 100A.

Figure 19:
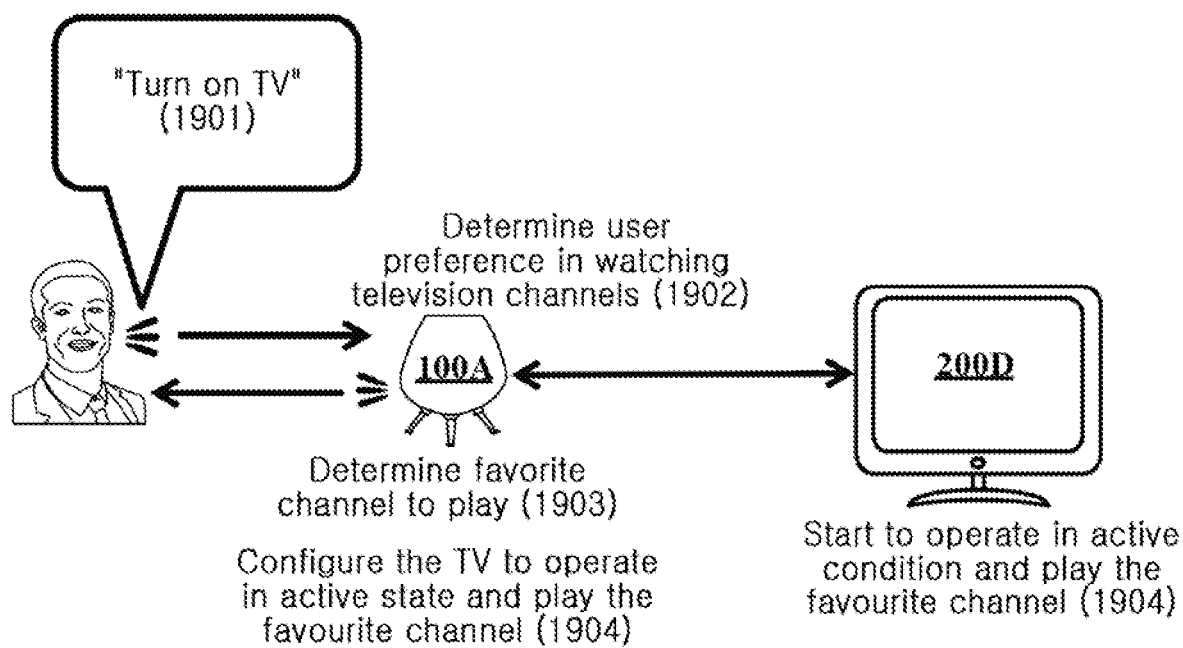
FIG. 19 illustrates an example scenario of determining a favorite television channel of the user at instant moment to play by the voice assistant, in response to receiving the voice query to switch on the television, according to an embodiment of the disclosure.

FIG. 19 illustrates an example scenario of identifying a favorite television channel of the user at an instant to play by the voice assistant 100A, in response to receiving the voice query to switch on the TV 200D, according to an embodiment as disclosed herein. Consider, the TV 200D is connected to the voice assistant 100A of the user, where the TV 200D is in an idle state. The voice assistant 100A stores the user preference in watching television channels at each instant of time by learning from historical user activities in watching TV 200D. The voice assistant 100A stores the user preference as the personal knowledge data.

Consider, the user provides (1901) the voice query "Turn on TV" to the voice assistant 100A. The voice assistant 100A receives the voice query and starts processing the voice query to generate the response. The voice assistant 100A identifies the favorite channel of the user at the instant of receiving the voice query based on the user preference in watching television channels at each instant (1902). Specifically, the voice assistant 100A may pre-store the user's preferred channel based on time information, user's viewing history, or the like. For example, information indicating that the user prefers a drama channel in the morning and a sports channel in the afternoon may be stored in the memory of the voice assistant 100A. The voice assistant 100A may identify the user's preferred channel based on time information at which the user's voice query is received (1903). For example, based on the time that the user's voice query is received is in the afternoon, the voice assistant 100A may identify the current user's preferred channel as a sports channel. In addition, the voice assistant 100A may generate a control command requesting to play the user's preferred channel on the TV 200D. Further, the voice assistant 100A determines whether the TV 200D operates in the idle state. Based on identifying that the TV 200D is in the idle state, the voice assistant 100A may generate a control command requesting that the TV 200D be changed from the idle state to the active state. The voice assistant 100A may generate a response including the control command requesting to change from the idle state to the active state in the third external device 400 and a control command requesting to play the user's preferred channel at the time the voice query is received (1904). Further, the voice assistant 100A may transmit the generated response to the TV 200D. In addition, the TV 200D operates in the active state based on the response received from voice assistant 100A and starts playing a favorite television channel (the user's most preferred channel at the present time) (1905).

Figure 20:
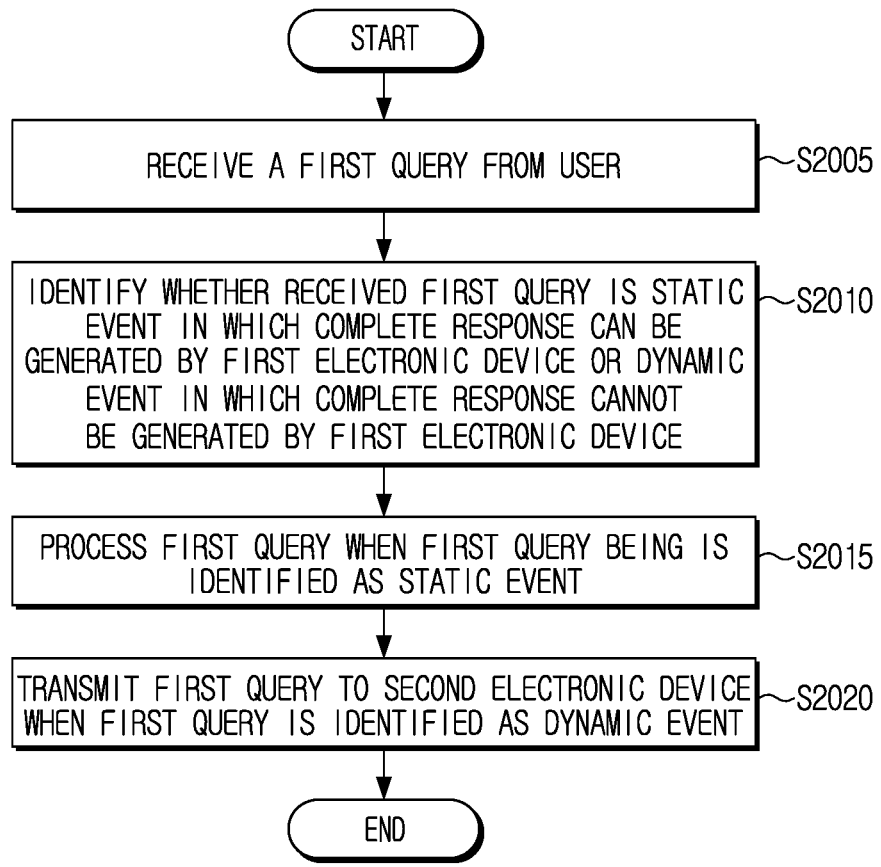
FIG. 20 is a flowchart illustrating an operation with respect to a first electronic device according to an embodiment of the disclosure.

FIG. 20 is a flowchart illustrating an operation of a first electronic device according to another embodiment of the disclosure.

Referring to FIG. 20, a method for controlling a first electronic device that manages a user query in an Internet of Things (IoT) network, the method may include receiving a first query from the user (or a voice of the user) (S2005), identifying whether the received first query is a static event in which a complete response can be generated by the first electronic device or a dynamic event in which a complete response cannot be generated by the first electronic device (S2010), based on the first query being identified as the static event, processing the first query (S2015), and based on the first query being identified as the dynamic event, transmitting the first query to a second electronic device (S2020).

The complete response to the first query may refer to a response accurately corresponding to the first query. The first electronic device 100 may receive the user's first query based on a microphone included in the first electronic device 100 or audio data received from an external device. The first electronic device 100 may provide a response corresponding to the received first query.

When the first electronic device 100 can provide a complete response to the first query, the first query may be identified as a static event. The static event may refer to an event (query) in which a perfect response may be generated only by the first electronic device 100.

In addition, when the first electronic device 100 cannot provide a complete response to the first query, the first electronic device 100 may identify the first query as a dynamic event. The dynamic event may refer to an event (query) in which a perfect response cannot be generated by only the first electronic device 100.

When the first query is identified as a static event, the first electronic device 100 may directly process the first query. The processing may refer to generating a complete response corresponding to the first query.

Also, when the first query is identified as a dynamic event, the first electronic device 100 may transmit the first query to the second electronic device 200. When the first query is a dynamic event, it means that the first electronic device 100 cannot generate a complete response, so that the first electronic device 100 may transmit the first query to the second electronic device 200 in order to generate a complete response from the second electronic device 200.

Wherein the identifying whether the first query is a static event or a dynamic event may comprise identifying one of a complete response to the first query, a partial response to the first query, and no response to the first query, based on capability parameters of the first electronic device, wherein the control method may further include based on the first electronic device being identified to be capable of generating a complete response to the first query, the first query processed by the first electronic device to generate the complete response to the first query, based on the first electronic device being identified to be capable of generating a partial response to the first query, processing a portion with respect to the first query in order to generate a partial response with respect to the first query and transmitting a control signal requesting the second electronic device to process remaining portions with respect to the first query to the second electronic device in order to generate a remaining response with respect to the first query, and based on the first electronic device being identified to be capable of generating no response to the first query, transmitting a control signal requesting the second electronic device to process the first query to the second electronic device in order to generate a complete response with respect to the first query.

The response corresponding to the first query may be of three types (complete response, partial response, no response). A complete response may mean an accurate answer corresponding to the user's first query, a partial response may mean that only a portion of the user's first query can be provided, and no response may mean that there is no information corresponding to the user's first query.

For example, it is assumed that the first query is "Let me know when and on which channel program A starts!". When the first electronic device 100 can identify both broadcast time information and channel information of the program A, receiving the first query in the first electronic device 100 may generate a complete response.

However, when the first electronic device 100 stores only broadcast time information of program A, the first electronic device 100 cannot provide channel information. Accordingly, the first electronic device 100 may generate only a partial response to the first query.

In addition, when the first electronic device 100 does not store all broadcast time information and channel information of program A, the first electronic device 100 may not generate a complete response or a partial response to the first query. In other words, the first electronic device 100 may generate no response to the first query.

If the first query in the first electronic device 100 is a query capable of providing a complete response, the first electronic device 100 may process the first query to generate a complete response.

If the first query (e.g., querying the broadcast time and channel of program A) in the first electronic device 100 is a query capable of providing a partial response, the first electronic device 100 may process the first query to generate a partial response. Specifically, a part (e.g., broadcast time) of the content included in the first query may be processed. Also, the first electronic device 100 may request the second electronic device 200 for an operation of generating a remaining response to the first query. Specifically, the first electronic device 100 may generate a control signal requesting the second electronic device 200 to process the remaining portion (e.g., channel) of the first query, and transmit the generated control signal to the second electronic device 200.

Further, when the first query in the first electronic device 100 is a query that generates no response, the first electronic device 100 may generate a control signal requesting the second electronic device 200 to process the complete response, and transmit the generated control signal to the second electronic device 200.

Meanwhile, the control method may further include, based on the first electronic device being identified to be capable of generating a partial response to the first query, identifying the second electronic device capable of the remaining response with respect to the first query, and transmitting (or redirecting) the first query to the identified second electronic device, based on functional parameters of a plurality of electronic devices included in the IoT network.

The function parameter may include at least one of a device type, a device identifier, a hardware standard, connection properties, or service availability.

If the first electronic device 100 identifies that a complete response to the first query cannot be generated and a partial response can be generated, the first electronic device 1 may identify an external device (second electronic device) capable of generating the remaining response among a plurality of devices included in the IoT network. Specifically, the first electronic device 100 may obtain information necessary to generate the remaining response and identify a device that stores the obtained information.

It has been described that the external device is included in the same IoT network as the first electronic device 100, but according to an implementation example, the external device may be a device included in a separate network instead of the same IoT network. Also, the external device may be a service provider or an external server.

Meanwhile, the control method may transmit a control signal requesting to generate a remaining response to the first query to the identified second electronic device, and when the remaining response to the first query is generated by the identified second electronic device, transmit a control signal requesting to transmit the remaining response to the first query to the first electronic device to the second electronic device.

The control signal requesting to transmit the remaining response to the generated first query to the first electronic device may be transmitted together with a control signal requesting to generate the remaining response to the first query. In other words, the first electronic device may generate remaining response to the first query in the second electronic device, and transmit a control signal requesting the generated remaining response to be transmitted to the first electronic device again to the second electronic device.

When the second electronic device 200 generates the remaining response, the second electronic device 200 may transmit the generated remaining response to the first electronic device 100. In addition, the first electronic device 100 may receive the remaining response from the second electronic device 200.

Meanwhile, the control method may further include receiving the remaining response with respect to the first query from the second electronic device, generating a complete response with respect to the first query by combining the partial response with respect to the first query generated by the first electronic device and the remaining response with respect to the first query received from the second electronic device, and providing the generated complete response to the user.

There may be multiple ways to provide a complete response to the user. For example, the first electronic device 100 may output a complete response in the form of image data or audio data through a display or speaker included in the first electronic device 100. As another example, the first electronic device 100 may transmit a complete response to the user terminal.

The control method may further include, based on the user being identified to be within a threshold distance from the first electronic device, providing the complete response to the user.

The first electronic device 100 may identify the user's location. For example, the first electronic device 100 may identify the user's location using a camera or an object recognition sensor. In addition, based on the user's location being within a threshold distance from the first electronic device 100, the first electronic device 100 may provide a complete response to the first query to the user.

The control method may further include, based on the first electronic device being identified to be capable of generating no response with respect to the first query, identifying the second electronic device capable of generating a complete response with respect to the first query, based on functional parameters of the plurality of electronic devices included in the IoT network, transmitting the first query and information available by the first electronic device to the identified second electronic device or transmitting the first query and information corresponding to the first query to the identified second electronic device, transmitting a control signal requesting the second electronic device to process the first query to the second electronic device in order to generate the complete response with respect to the first query, based on the received first query and information available by the first electronic device or information corresponding to the first query, and providing the complete response to the user (by displaying the complete response as image data or outputting the complete response as sound data).

If the first electronic device 100 identifies as generating no response to the first query, the first electronic device 100 may identify an external device (second electronic device) capable of generating a complete response among a plurality of devices included in the IoT network. Specifically, the first electronic device 100 may obtain information necessary to generate a complete response and identify a device that stores the obtained information.

It has been described that the external device is included in the same IoT network as the first electronic device 100, but according to an implementation example, the external device may be a device included in a separate network instead of the same IoT network. Also, the external device may be a service provider or an external server. The control method may further include, based on the second electronic device capable of generating the remaining response with respect to the first query being not identified according to the functional parameters of the plurality of electronic devices included in the IoT network, reporting information that the complete response with respect to the first query cannot be generated to a service provider, receiving updates of a service related to the first query from the service provider, upgrading functions based on the updates of the service received from the service provider, and generating the complete response to the first query based on the upgraded function. If generation of a complete response for the first query is impossible even after the service functions were upgraded, the processor 110 may request a new second query different from the first query to the user. In case generation of a complete response is impossible, the first query may include somewhat unclear or incorrect words. Accordingly, the processor 110 may induce generation of a complete response by newly requesting a second query. For example, it will be assumed that the first query is "Tell me how to cook a cake". The processor 110 may not generate a complete response for a method of cooking a cake, and may perform upgrade of the service functions. However, the processor 110 may not generate a complete response for the first query even after upgrading the service functions. Here, the processor 110 may request a second query that is associated with the first query and includes a more detailed content to the user. Here, for an operation of requesting a second query, the processor 110 may display guide information requesting a second query on the display, or output guide information requesting a second query through the speaker. Meanwhile, at the same time as performing an operation of requesting a second query to the user, the processor 110 may provide together a reason that a complete response for the first query cannot be generated. For example, if it is assumed that the first query is "Tell me how to cook a cake", the processor 110 may provide information such as "As there are so many kinds of cakes, it is impossible to give you an answer. Please tell me the kind of cakes for which you want a cooking method", "I did not catch you correctly. Please tell me again", etc. to the user. That is, if the processor 110 identifies that a complete response for the first query cannot be generated even after the service functions were upgraded, the processor 110 may provide information including a reason that a complete response for the first query cannot be generated, and a request for a new second query associated with the first query to the user.

Based on the first electronic device 100 identifying that the complete response to the first query cannot be directly generated, the first electronic device 100 may identify whether the complete response can be generated by using an electronic device included in the same IoT network. Based on identifying that generating a complete response to the first query is still impossible even using the electronic device included in the same IoT network, the first electronic device 100 may receive necessary services (or information) in generating a complete response to the first query, such as via a software update.

The control method may further include, based on the complete response with respect to the first query being identified no to be generated, requesting a second query related to the first query to the user, based on the upgraded functions, receiving the second query from the user, generating a complete response with respect to the second query using the upgraded functions, and providing the complete response with respect to the second query to the user.

Meanwhile, when a complete response to the first query cannot be generated even though the service function has been upgraded (or received information) from the service provider, the first electronic device 100 may request a new second query related to the first query from the user. The first electronic device 100 may receive the second query from the user and generate a complete response to the received second query.

According to an embodiment of the disclosure, an electronic device that manages a user query in an Internet of Things (IoT) network, the device may include a memory, and a processor coupled to the memory, wherein the processor is configured to receive a first query from the user, identify whether the received first query is a static event in which a complete response can be generated by the first electronic device or a dynamic event in which a complete response cannot be generated by the first electronic device, based on the first query being identified as the static event, process the first query; and based on the first query being identified as the dynamic event, transmit the first query to a second electronic device.

Meanwhile, the processor is configured to identify one of a complete response to the first query, a partial response to the first query, and no response to the first query, based on capability parameters of the first electronic device, based on the first electronic device being identified to be capable of generating a complete response to the first query, comprise the first query processed by the first electronic device to generate the complete response to the first query, based on the first electronic device being identified to be capable of generating a partial response to the first query, process a portion with respect to the first query in order to generate a partial response with respect to the first query and transmit a control signal requesting the second electronic device to process remaining portions with respect to the first query to the second electronic device in order to generate a remaining response with respect to the first query, and based on the first electronic device being identified to be capable of generating no response to the first query, transmit a control signal requesting the second electronic device to process the first query to the second electronic device in order to generate a complete response with respect to the first query.

The processor is configured to, based on the first electronic device being identified to be capable of generating a partial response to the first query, identify the second electronic device capable of the remaining response with respect to the first query, and transmit the first query to the identified second electronic device, based on functional parameters of a plurality of electronic devices included in the IoT network.

The processor is configured to transmit a control signal requesting to generate the remaining response with respect to the first query to the identified second electronic device, and transmit a control signal requesting to transmit the remaining response with respect to the first query generated by the identified second electronic device to the first electronic device, to the identified second electronic device.

The processor is configured to receive the remaining response with respect to the first query from the second electronic device, generate a complete response with respect to the first query by combining the partial response with respect to the first query generated by the first electronic device and the remaining response with respect to the first query received from the second electronic device, and provide the generated complete response to the user.

The processor is configured to, based on the user being identified to be within a threshold distance from the first electronic device, provide the complete response to the user (by displaying the complete response as image data or outputting the complete response as sound data).

The processor is configured to, based on the first electronic device being identified to be capable of generating no response with respect to the first query, identify the second electronic device capable of generating a complete response with respect to the first query, based on functional parameters of the plurality of electronic devices included in the IoT network, transmit the first query and information available by the first electronic device to the identified second electronic device, transmit a control signal requesting the second electronic device to process the first query to the second electronic device in order to generate the complete response with respect to the first query, based on the received first query and information available by the first electronic device, and provide the complete response to the user.

The processor is configured to, based on the second electronic device capable of generating the remaining response with respect to the first query being not identified according to the functional parameters of the plurality of electronic devices included in the IoT network, report information that the complete response with respect to the first query cannot be generated to a service provider, receive updates of a service related to the first query from the service provider, upgrade functions based on the updates of the service received from the service provider, and generate the complete response to the first query based on the upgraded function.

The processor is configured to, based on the complete response with respect to the first query being identified no to be generated, request a second query related to the first query to the user, based on the upgraded functions, receive the second query from the user, generate a complete response with respect to the second query using the upgraded functions, and provide the complete response with respect to the second query to the user.

According to an embodiment of the disclosure, a system for managing a user query in an Internet of Things (IoT) network, the system may include a first electronic device, and at least second electronic device, wherein the first electronic device receives a first query from the user, identifies whether the received first query is a static event in which a complete response can be generated by the first electronic device or a dynamic event in which a complete response cannot be generated by the first electronic device, based on the first query being identified as the static event, processes the first query, and based on the first query being identified as the dynamic event, transmits the first query to a second electronic device, and wherein the second electronic device is configured to, based on the first query corresponding to the dynamic event being received from the first electronic device, process the first query to generate a complete response with respect to the first query.

If it is identified that a complete response to the first query can be generated, the first electronic device 100 may directly process the first query to generate a complete response.

If it is identified that a partial response to the first query can be generated in the first electronic device 100, the first electronic device 100 may generate a partial response, and the remaining response may be generated in the second electronic device 200. In addition, the second electronic device 200 may transmit the generated response to the first electronic device 100.

If it is identified that no response to the first query can be generated in the first electronic device 100, the second electronic device 200 may generate a complete response to the first query. In addition, the second electronic device 200 may transmit the generated remaining response to the first electronic device 100.

Meanwhile, it has been described that the second electronic device 200 transmits the first electronic device 100 after generating the remaining response or the complete response. However, according to implementation examples, the second electronic device 200 may be implemented in a form in which the remaining response or the complete response is directly provided to the user.

Meanwhile, according to various embodiments of the disclosure described above may be implemented in the form of an application that can be installed in an existing electronic device.

In addition, the methods according to various embodiments of the disclosure may be implemented only by software upgrade or hardware upgrade of an existing electronic device.

In addition, the various embodiments of the disclosure described above may be performed through an embedded server provided in an electronic device or at least one external server of an electronic device and a display device.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added. The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for controlling a first electronic device in an Internet of Things (IoT) network, the method comprising:
   receiving a first query from a user;
   identifying whether the first electronic device is capable of generating a complete response corresponding to the first query based on capability parameters of the first electronic device or generating a partial response to the first query based on a remaining response corresponding to the first query requiring use of a sensor unavailable at the first electronic device,
   based on identifying that the first electronic device is capable of generating the complete response corresponding to the first query, processing the first query to generate the complete response corresponding to the first query, and performing or outputting the generated complete response to the user;
   based on identifying that the first electronic device is capable of generating only the partial response corresponding to the first query, transmitting, via the IoT network, the first query to a second electronic device in the IoT network that is capable of generating the remaining response corresponding to the first query;
   based on the first electronic device being identified to be capable of generating only the partial response corresponding to the first query, obtaining the partial response and transmitting, via the IoT network, a first control signal, to the second electronic device, requesting that the second electronic device generates the remaining response corresponding to the first query; and
   based on the user being identified to be within a threshold distance from the second electronic device, transmitting, via the IoT network, a second control signal to the second electronic device, requesting that the second electronic device performs or outputs the generated complete response to the user.

2. The method of claim 1, wherein the transmitting the first query to the second electronic device that is capable of generating the remaining response corresponding to the first query comprises:
   identifying one or more electronic devices in the IoT network that are within a vicinity threshold distance away from the first electronic device and that are capable of generating the remaining response corresponding to the first query; and
   transmitting the first query to one of the identified one or more electronic devices that are within the vicinity of the first electronic device.

3. The method of claim 1, further comprising:
   based on the first electronic device being identified as not being capable of generating the complete response nor the partial response corresponding to the first query, transmitting a third control signal, to the second electronic device, requesting the second electronic device to process the first query in order to generate the complete response corresponding to the first query.

4. The method of claim 1, further comprising:
   based on the first electronic device being identified to be capable of generating the partial response corresponding to the first query, identifying the second electronic device capable of generating the remaining response corresponding to the first query, and transmitting the first query to the identified second electronic device, based on functional parameters of a plurality of electronic devices included in the IoT network.

5. The method of claim 4, further comprising:
   transmitting a fourth control signal requesting to generate the remaining response corresponding to the first query to the identified second electronic device, and transmitting a fifth control signal requesting to transmit the remaining response corresponding to the first query generated by the identified second electronic device to the first electronic device.

6. The method of claim 5, further comprising:
   receiving the remaining response corresponding to the first query from the second electronic device;
   generating the complete response corresponding to the first query by combining the partial response corresponding to the first query generated by the first electronic device and the remaining response corresponding to the first query received from the second electronic device; and
providing the generated complete response to the user.

7. The method of claim 4, further comprising: based on the second electronic device being unable to generate the remaining response corresponding to the first query according to the functional parameters of the plurality of electronic devices included in the IoT network, reporting information that the complete response corresponding to the first query cannot be generated to a service provider;
receiving updates of a service related to the first query from the service provider;
upgrading functions based on the updates of the service received from the service provider; and
generating the complete response corresponding to the first query based on the upgraded functions.

8. The method of claim 7, further comprising: based on, after upgrading functions based on the updates of the service, the complete response corresponding to the first query being identified as not being able to be generated, requesting a second query related to the first query to the user, based on the upgraded functions;
receiving the second query from the user;
generating the complete response corresponding to the second query using the upgraded functions; and
providing the complete response corresponding to the second query to the user.

9. The method of claim 1, further comprising: based on the user being identified to be within the threshold distance from the first electronic device, providing the complete response to the user.

10. The method of claim 1, further comprising: based on the first electronic device being identified as not being capable of generating the complete response corresponding to the first query, identifying the second electronic device capable of generating the complete response corresponding to the first query, based on functional parameters of a plurality of electronic devices included in the IoT network;
transmitting the first query and information corresponding to the first query to the identified second electronic device;
transmitting, to the second electronic device, a sixth control signal requesting the second electronic device to process the first query in order to generate the complete response corresponding to the first query, based on the received first query and the information corresponding to the first query; and
providing the complete response to the user.

11. A first electronic device comprising:
an Internet of Things (IoT) communication interface configured to communicate with one or more other IoT devices over an IoT network;
a memory; and
a processor coupled to the memory, wherein the processor is configured to:
receive a first query from a user;
identify whether the first electronic device is capable of performing the complete response corresponding to the first query based on capability parameters of the first electronic device or generating a partial response to the first query based on a remaining response corresponding to the first query requiring use of a sensor unavailable at the first electronic device;
based on identifying that the first electronic device is capable of generating the complete response corresponding to the first query, process the first query to generate the complete response corresponding to the first query, and perform or output the generated complete response to the user;
based on identifying that the first electronic device is capable of generating only the partial response corresponding to the first query, control the IoT communication interface to transmit, via the IoT network, the first query to a second electronic device in the IoT network that is capable of generating the remaining response corresponding to the first query; and
based on the first electronic device being identified to be capable of generating the partial response corresponding to the first query, obtain the partial response and control the IoT communication interface to transmit, to the second electronic device, a first control signal requesting the second electronic device to generate the remaining response corresponding to the first query; and
based on the user being identified to be within a threshold distance from the second electronic device, transmitting, via the IoT network, a second control signal to the second electronic device, requesting that the second electronic device performs or outputs the generated complete response to the user.

12. The first electronic device of claim 11, wherein the processor is further configured to control the IoT communication interface to transmit the first query to the second electronic device that is capable of generating the remaining response corresponding to the first query by:
identifying one or more electronic devices in the IoT network that are within a vicinity threshold distance away from the first electronic device and that are capable of generating the remaining response corresponding to the first query; and
controlling the IoT communication interface to transmit the first query to one of the identified one or more electronic devices that are within the vicinity of the first electronic device.

13. The first electronic device of claim 11, wherein the processor is further configured to:
based on the first electronic device being identified as not being capable of generating the complete response corresponding to the first query, control the IoT communication interface to transmit, to the second electronic device, a third control signal requesting the second electronic device to process the first query in order to generate the complete response corresponding to the first query.

14. The first electronic device of claim 11, wherein the processor is further configured to, based on the first electronic device being identified as being capable of generating the partial response corresponding to the first query, identify the second electronic device capable of the remaining response corresponding to the first query, and control the IoT communication interface to transmit, to the identified second electronic device, the first query based on functional parameters of a plurality of electronic devices included in the IoT network.

15. The first electronic device of claim 14, wherein the processor is further configured to:
control the IoT communication interface to transmit, to the identified second electronic device, one or more control signals requesting to generate the remaining response corresponding to the first query, and requesting to transmit the remaining response corresponding to the first query generated by the identified second electronic device to the first electronic device.

16. The first electronic device of claim 14, wherein the processor is further configured to:
receive the remaining response corresponding to the first query from the second electronic device;
generate the complete response corresponding to the first query by combining the partial response corresponding to the first query generated by the first electronic device and the remaining response corresponding to the first query received from the second electronic device; and
provide the generated complete response to the user.

17. The first electronic device of claim 11, wherein the processor is further configured to, based on the user being identified to be within the threshold distance from the first electronic device, provide the complete response to the user.

* * * * *